(12) United States Patent
Hui et al.

(10) Patent No.: US 9,351,228 B2
(45) Date of Patent: May 24, 2016

(54) METRIC COMPUTATION FOR INTERFERENCE-AWARE ROUTING

(71) Applicant: Optis Cellular Technology, LLC, Plano, TX (US)

(72) Inventors: Dennis Hui, Sunnyvale, CA (US); Johan Axnäs, Solna (SE); Kumar Balachandran, Pleasanton, CA (US); Robert Baldemair, Solna (SE); Hugo Tullberg, Nyköping (SE)

(73) Assignee: Optis Cellular Technology, LLC, Plano, TX (US)

( * ) Notice: Subject to any disclaimer, the term of this patent is extended or adjusted under 35 U.S.C. 154(b) by 123 days.

(21) Appl. No.: 14/035,213

(22) Filed: Sep. 24, 2013

(65) Prior Publication Data

US 2014/0086080 A1    Mar. 27, 2014

Related U.S. Application Data

(60) Provisional application No. 61/705,679, filed on Sep. 26, 2012.

(51) Int. Cl.
*H04W 40/16* (2009.01)
*H04L 12/721* (2013.01)

(52) U.S. Cl.
CPC ............. *H04W 40/16* (2013.01); *H04L 45/124* (2013.01)

(58) Field of Classification Search
None
See application file for complete search history.

(56) References Cited

U.S. PATENT DOCUMENTS

| 7,570,593 | B1 * | 8/2009 | ElBatt et al. | 370/238 |
| 8,532,023 | B2 * | 9/2013 | Buddhikot et al. | 370/328 |
| 2003/0142627 | A1 * | 7/2003 | Chiu et al. | 370/238 |
| 2005/0243757 | A1 * | 11/2005 | Yagyu | H04L 12/4625 370/328 |
| 2006/0083186 | A1 * | 4/2006 | Handforth et al. | 370/310 |
| 2008/0310343 | A1 * | 12/2008 | Balachandran et al. | 370/328 |
| 2009/0097585 | A1 * | 4/2009 | Kou et al. | 375/267 |
| 2010/0246480 | A1 * | 9/2010 | Aggarwal et al. | 370/328 |

OTHER PUBLICATIONS

Awerbuch, B. et al., "High Throughput Route Selection in Multi-Rate Ad Hoc Wireless Networks," Johns Hopkins University Technical Report, Version 2, Mar. 12, 2003, Baltimore, Maryland, 15 pages.
Bertsekas, D. et al., "Data Networks," 2nd Edition, Prentice-Hall, Inc., 1992, 574 pages.

(Continued)

*Primary Examiner* — Alex Skripnikov

(57) ABSTRACT

Systems and methods for computing and/or utilizing mutual information based link metrics for a link in a wireless mesh network are disclosed. In one embodiment, one or more mutual information values are computed for a link between a transmitter of a first network node and a receiver of a second network node in a wireless mesh network. Each of the one or more mutual information values is computed for a different hypothesized transmission mode for the link. One or more link metrics for the link are computed as a function of the mutual information values, where each link metric is computed based on a different one of the one or more mutual information values. In this manner, a link metric is computed for each of the one or more hypothesized transmission modes for the link. At least one of the link metrics are then provided to a routing update module.

25 Claims, 13 Drawing Sheets

(56) References Cited

OTHER PUBLICATIONS

Blahut, Richard E., "Signaling with a Bandwidth Constraint," Principles and Practice of Information Theory (book excerpt), Chapter 7.8, Addison-Wesley Publishing Company, Sep. 1991, pp. 272-279.

Cover, T. et al., "Elements of Information Theory," John Wiley & Sons, Inc., 1991, 563 pages.

Draves, R. et al., "Routing in Multi-Radio, Multi-Hop Wireless Mesh Networks," The Tenth Annual International Conference on Mobile Computing and Networking, Sep. 26-Oct. 1, 2004, Philadelphia, Pennsylvania, ACM, 15 pages.

Holland, G. et al., "A Rate-Adaptive MAC Protocol for Multi-Hop Wireless Networks," The Seventh Annual International Conference on Mobile Computing and Networking, Jul. 2001, Rome, Italy, ACM, 15 pages.

Kamerman, A. et al., "WaveLAN-II: A High-Performance Wireless LAN for the Unlicensed Band," Bell Labs Technical Journal, vol. 2, No. 3, Jun. 21, 1997, Lucent Technologies Inc., 16 pages.

Parissidis, G., "Interference-Aware Routing in Wireless Multihop Networks," PhD Dissertation, ETH Zurich, Apr. 2008, Zurich, Switzerland, 183 pages.

Yang, Y. et al., "Designing Routing Metrics for Mesh Networks," Proceedings of the First IEEE Workshop on Wireless Mesh Networks, Sep. 26, 2005, Santa Clara, California, 9 pages.

International Search Report and Written Opinion received in corresponding Patent Cooperation Treaty Application No. PCT/IB2013/058863, mailed Apr. 28, 2014, 10 pages.

De Rango, Floriano, et al., "Interference-Aware Ad-Hoc on Demand Distance Vector (IA-AODV) Protocol," International Symposium on Performance Evaluation of Computer and Telecommunication Systems, Jul. 13, 2009, pp. 170-177.

Jensen, Tobias L., et al., "Mutual Information Metrics for Fast Link Adaptation in IEEE 802.11n," IEEE International Conference on Communications, May 19, 2008, pp. 4910-4915.

\* cited by examiner

METRIC COMPUTATION FOR INTERFERENCE-AWARE ROUTING

RELATED APPLICATIONS

This application claims the benefit of provisional patent application Ser. No. 61/705,679, filed Sep. 26, 2012, the disclosure of which is hereby incorporated herein by reference in its entirety.

FIELD OF THE DISCLOSURE

The present disclosure relates to a wireless mesh network and more particularly relates to computing a link metric for interference-aware routing in a wireless mesh network.

BACKGROUND

The explosive rise in popularity of smart phones has exposed the capacity limitation of current cellular communications networks. The increasing usage of bandwidth-demanding multimedia and social networking applications on mobile devices further exacerbates the problem. To cope with the exponential growth in wireless data traffic, it is anticipated that substantially denser deployment of access nodes will be required in the future. Such a dense deployment may be achieved by gradually augmenting existing base stations with a much denser mix of "smaller," or low power, base stations with reduced signal footprints.

Clearly, the feasibility of a very dense deployment of access nodes is predicated on the existence of a backhaul network that can provide high-data-rate transport for each individual access node in the network. From the viewpoint of maximizing capacity, optical-fiber-based backhaul solutions are probably the most desirable ones and are most suitable for new constructions. However, in existing buildings and infrastructure, the cost of installation of new fibers to every access node in a very dense network can be prohibitive.

An alternative to an optical-fiber-based backhaul solution is a wireless self-backhaul solution where the same access spectrum is used to provide transport. A large amount of bandwidth is expected to be available in high frequency bands (e.g., the Millimeter Wave (MMW) bands) where future wireless systems are likely to be deployed. In addition, these future wireless systems have the potential of a high degree of spatial reuse due to the associated reduced radio wavelengths. Both the large amount of available bandwidth and the high degree of spatial reuse motivate the self-backhauling approach. The simplicity of the wireless self-backhaul approach and the potential of substantially reducing the deployment cost also make the wireless self-backhaul approach very attractive.

As illustrated in FIG. 1, in the self-backhauling approach, an access node (AN) provides network access to user equipments in its vicinity that are assigned to the access node as well as transport for neighboring access nodes. With regard to transport, the access node operates as a relay node in order to route data toward and/or from an aggregation node. A group of self-backhauling access nodes can form a wireless mesh network, where the access nodes cooperatively route each other's traffic to and from the aggregation node. The aggregation node connects the wireless mesh network to a larger network (e.g., a core network of the associated cellular communications network).

Not only does self-backhauling eliminate the need to install additional wires/fibers and hence substantially reduce deployment cost, self-backhauling also provides the ultimate flexibility for users or network operators to deploy access nodes anywhere there is unmet traffic demand. Even in the case when wired (fiber or copper based) backhaul is available, self-backhauling can still serve as a fallback or a diversifying solution to enhance the reliability of the network.

Transporting information wirelessly through a wireless mesh network formed by self-backhauling access nodes requires the use of routing algorithms in combination with a routing metric to select which route among all possible routes with one or more hops should be used. Common routing algorithms include the Bellman-Ford algorithm and the Dijkstra algorithm, as described in D. P. Bertsekas and R. G. Gallager, "Data Networks," $2^{nd}$ Edition, Prentice Hall, 1992. These algorithms typically find the shortest path (or route), in the sense of yielding the best routing metric value, among all possible paths from a source node to a destination node. The inventors have found that existing routing metrics, such as those described in Georgios Parissidis, "Interference-Aware Routing Wireless Multihop Network," Doctoral Dissertation, DEA Universite Paris VI, 2008; R. Draves, J. Padhye, and B. Zill, "Routing in Multi-Radio Multi-Hop Wireless Mesh Networks," ACM Mobicom, 2004; Y. Yang, J. Wang, R. Kravets, "Designing Routing Metrics for Mesh Networks," Proc. IEEE Workshop on Wireless Mesh Networks, 2005; B. Awerbuch, D. Holmer, H. Ruberns, "High Throughput Route Selection in Multi-Rate Ad Hoc Wireless Networks," Technical Report, Johns Hopkins University, 2003; A. Kamerman and L. Monteban, "WaveLAN-II: A High-Performance Wireless LAN for the Unlicensed Band," Bell Labs Technical Journal, pp. 118-133, 1997; and G. Holland, N. Vaidya, and P. Bahl, "A Rate-Adaptive Protocol for Multi-hop Wireless Networks," Proc. ACM MOBICOM 01, 2001 are less than optimal, particularly for wireless self-backhaul for a group of access nodes in a cellular communications network.

SUMMARY

The present disclosure relates mutual-information based link metrics for a link in a wireless mesh network. In one embodiment, one or more mutual information values are computed for a link between a transmitter of a first network node and a receiver of a second network node in a wireless mesh network. Each of the one or more mutual information values is computed for a different one of one or more hypothesized transmission modes for the link. One or more link metrics for the link are computed as a function of the mutual information values, where each link metric is computed based on a different one of the one or more mutual information values. In this manner, a link metric is computed for each of the one or more hypothesized transmission modes for the link. At least one of the link metrics are then provided to a routing update module. In one particular embodiment, the wireless mesh network is a wireless backhaul mesh network for a group of access nodes in a cellular communications network.

In another embodiment, a routing update module obtains one or more mutual information based link metrics for a link between a transmitter of a first network node and a receiver of a second network node in a wireless mesh network. Each of the one or more mutual information based link metrics is for a different one of one or more transmission modes for the link. The routing update module computes one or more routing metrics for one or more potential routes through the wireless mesh network that include the link between the transmitter of the first network node and the receiver of the second network node based on the one or more mutual information based link metrics for the link. The routing update module then updates a routing table for the transmitter of the first network node based on the one or more routing metrics.

In another embodiment, one or more mutual information based link metrics are obtained for each link of a number of links between transmitters and receivers of at least a subset of a number of network nodes in a wireless mesh network. For each link, the one or more mutual information based link metrics for the link are for one or more transmission modes for the link such that each mutual information based link metric for the link is a mutual information based link metric for the link for a different one of the one or more transmission modes for the link. Routing metrics for a number of potential routes through the wireless mesh network from a first network node to a second network node are computed as a function of the one or more mutual information based link metrics for the links included in the potential routes. One of the potential routes having a best routing metric is selected as a best route from the first network node to the second network node. A routing table is then updated to reflect the best route from the first network node to the second network node.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
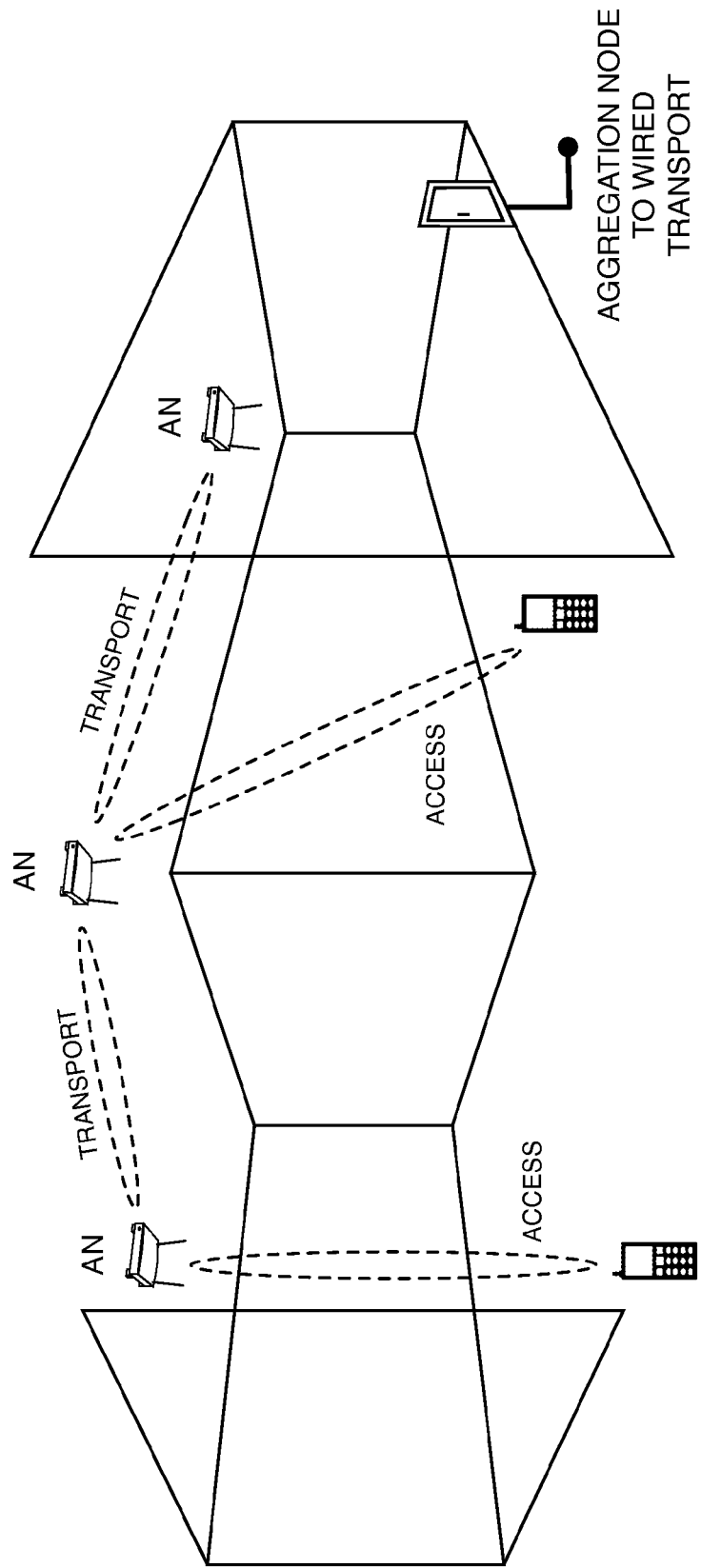
FIG. 1 illustrates a wireless mesh backhaul network for a group of access nodes in a cellular communications network.
Figure 2:
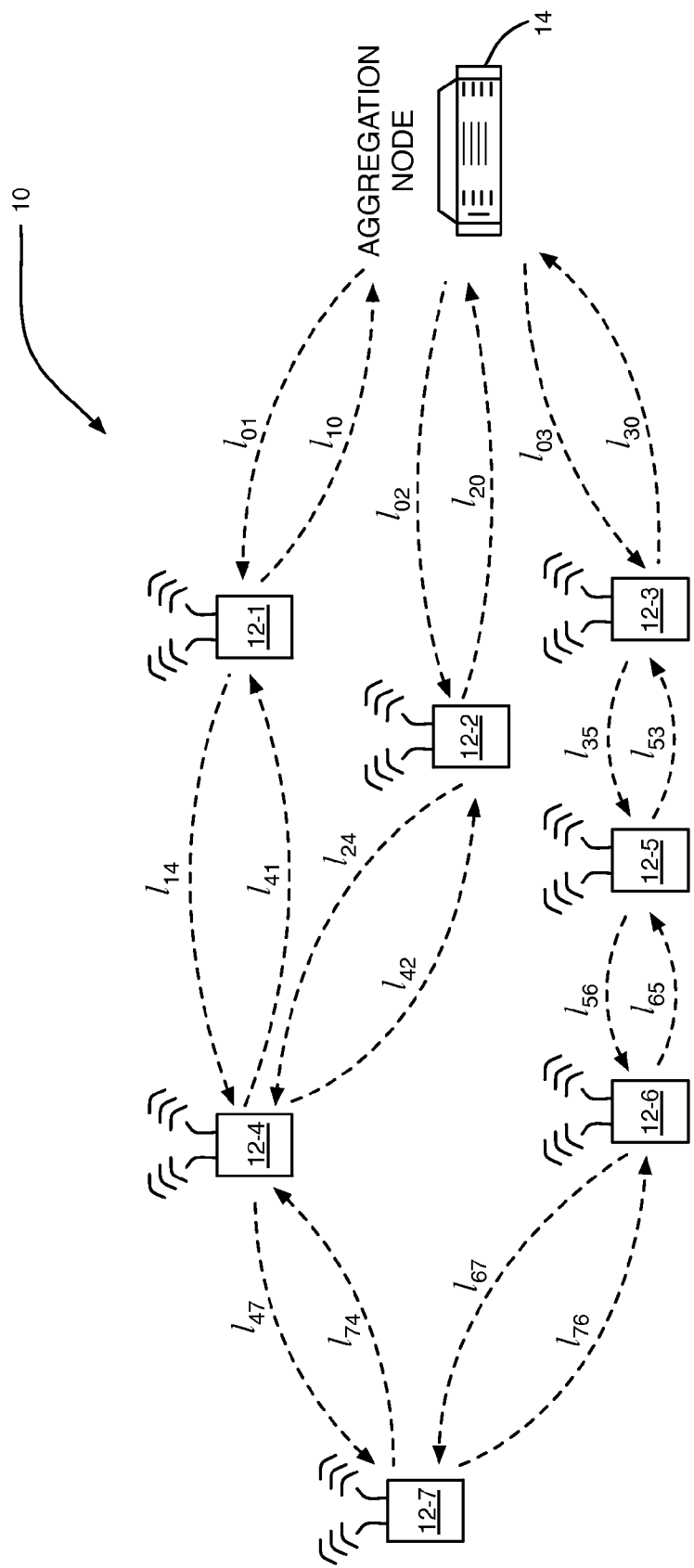
FIG. 2 illustrates a wireless mesh backhaul network for a group of access nodes in a cellular communications network for which link metrics are computed as a function of mutual information according to one embodiment of the present disclosure.
Figure 3:
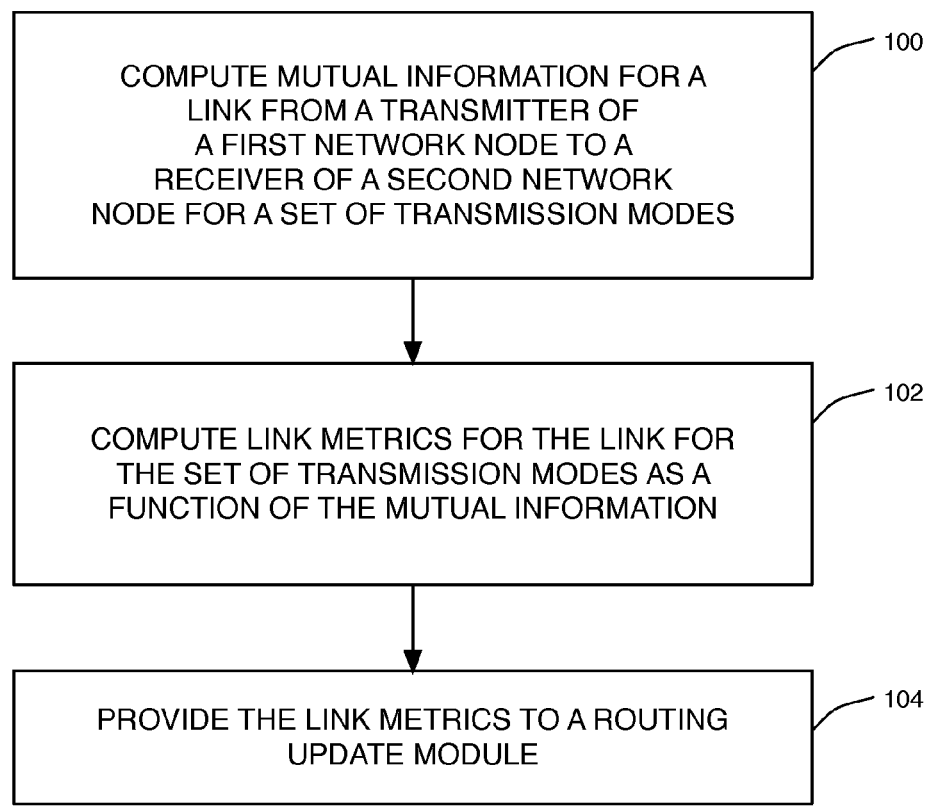
Figure 4:
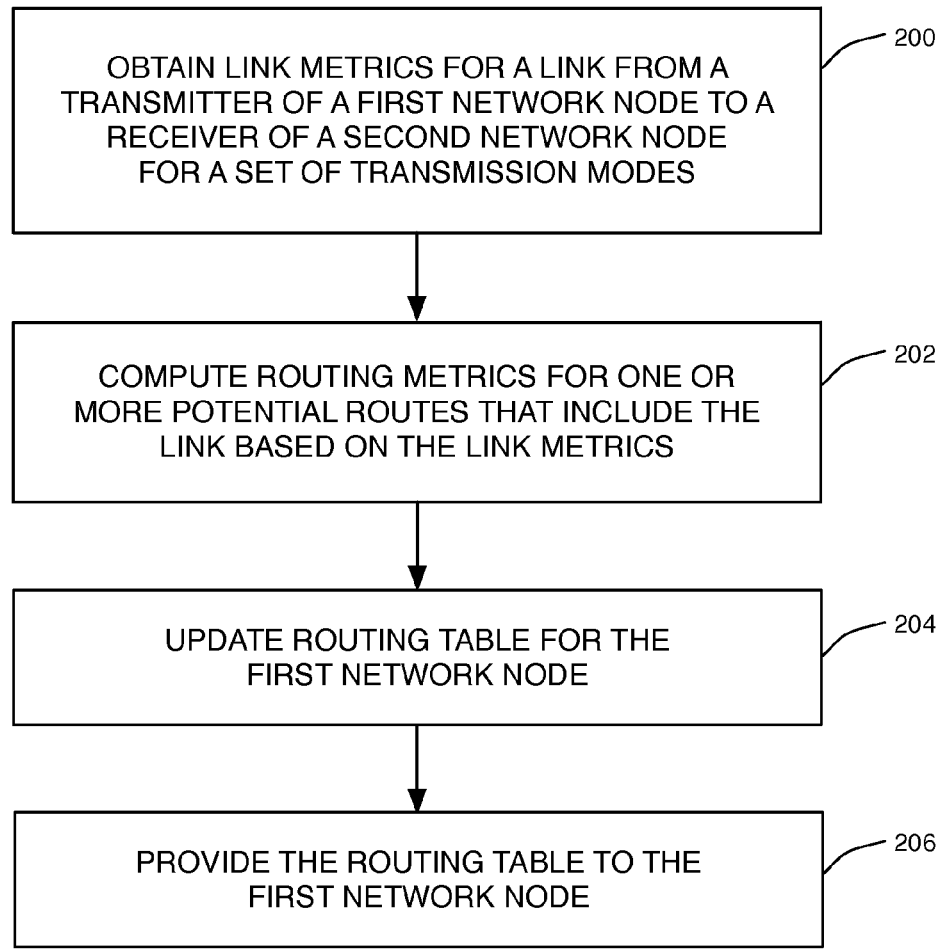
Figure 5:
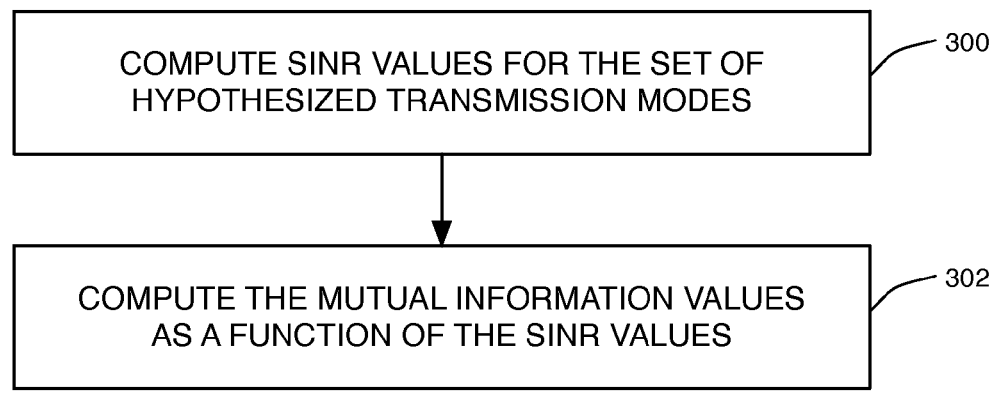
Figure 6:
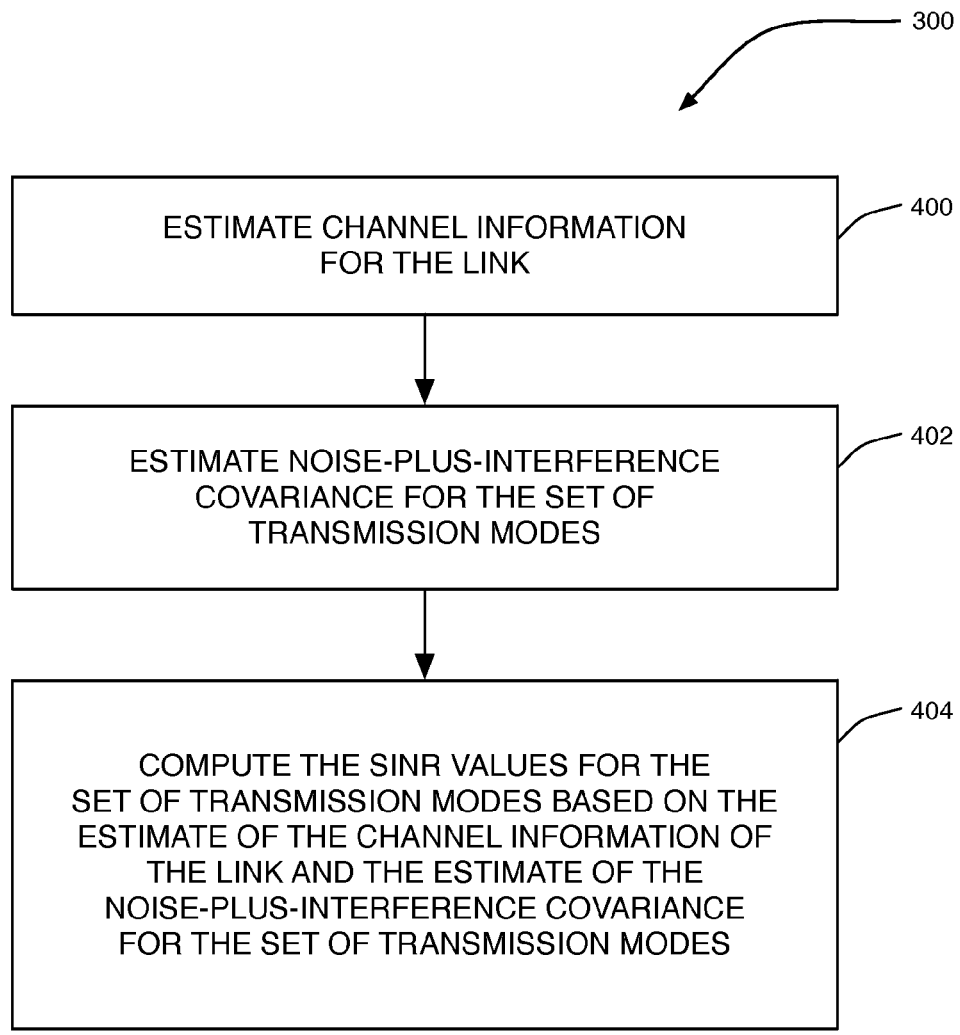
Figure 7:
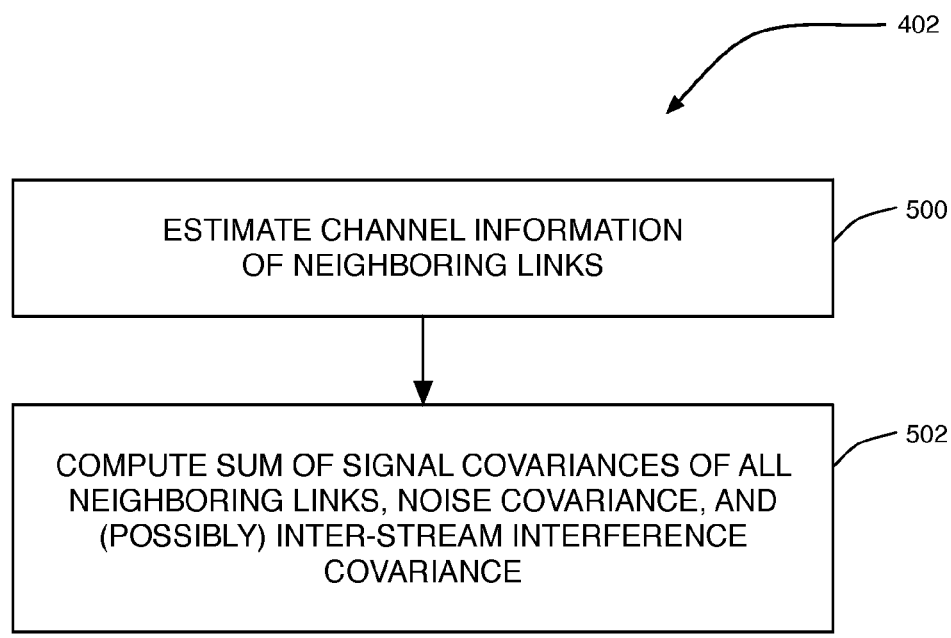
Figure 8:
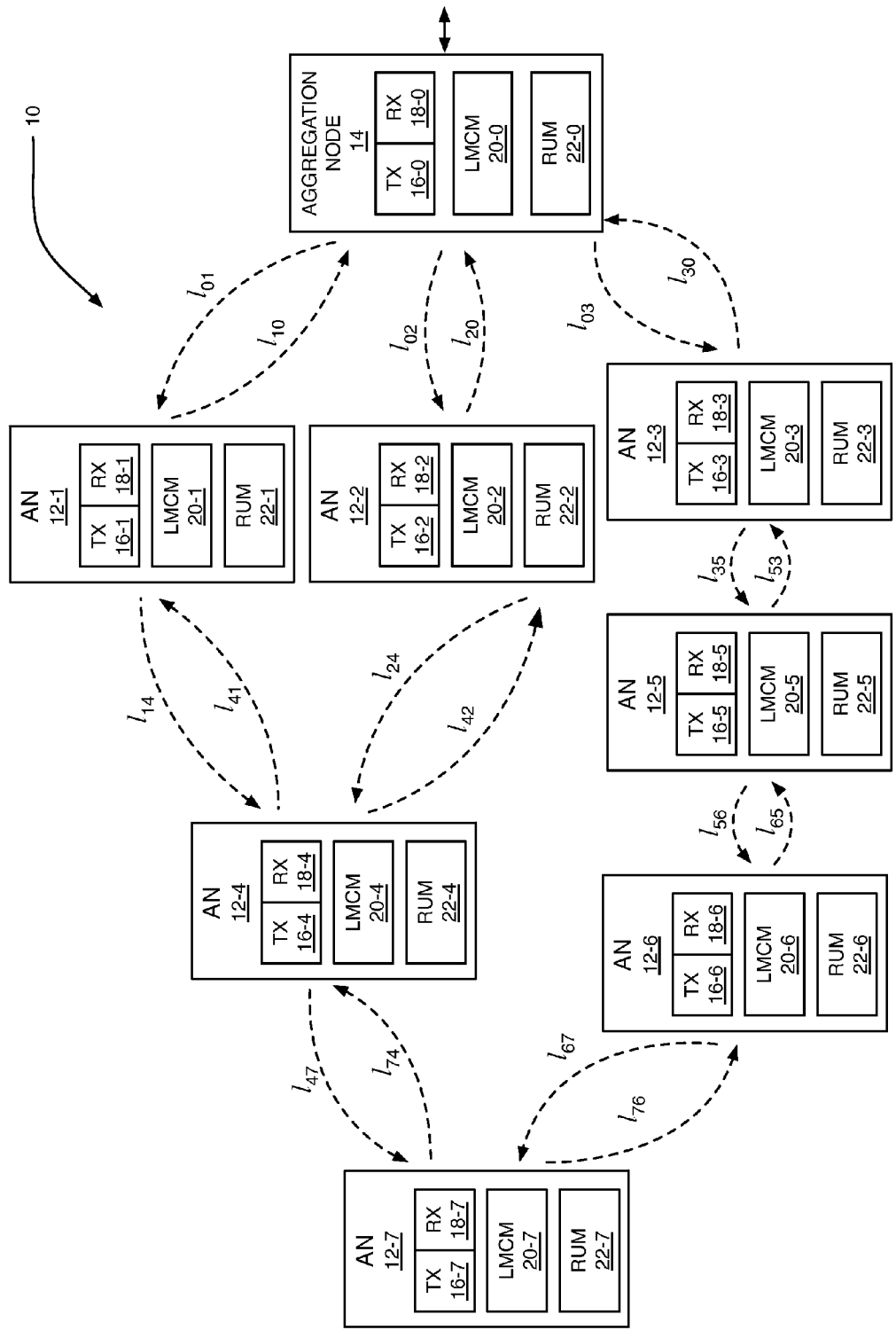
Figure 9:
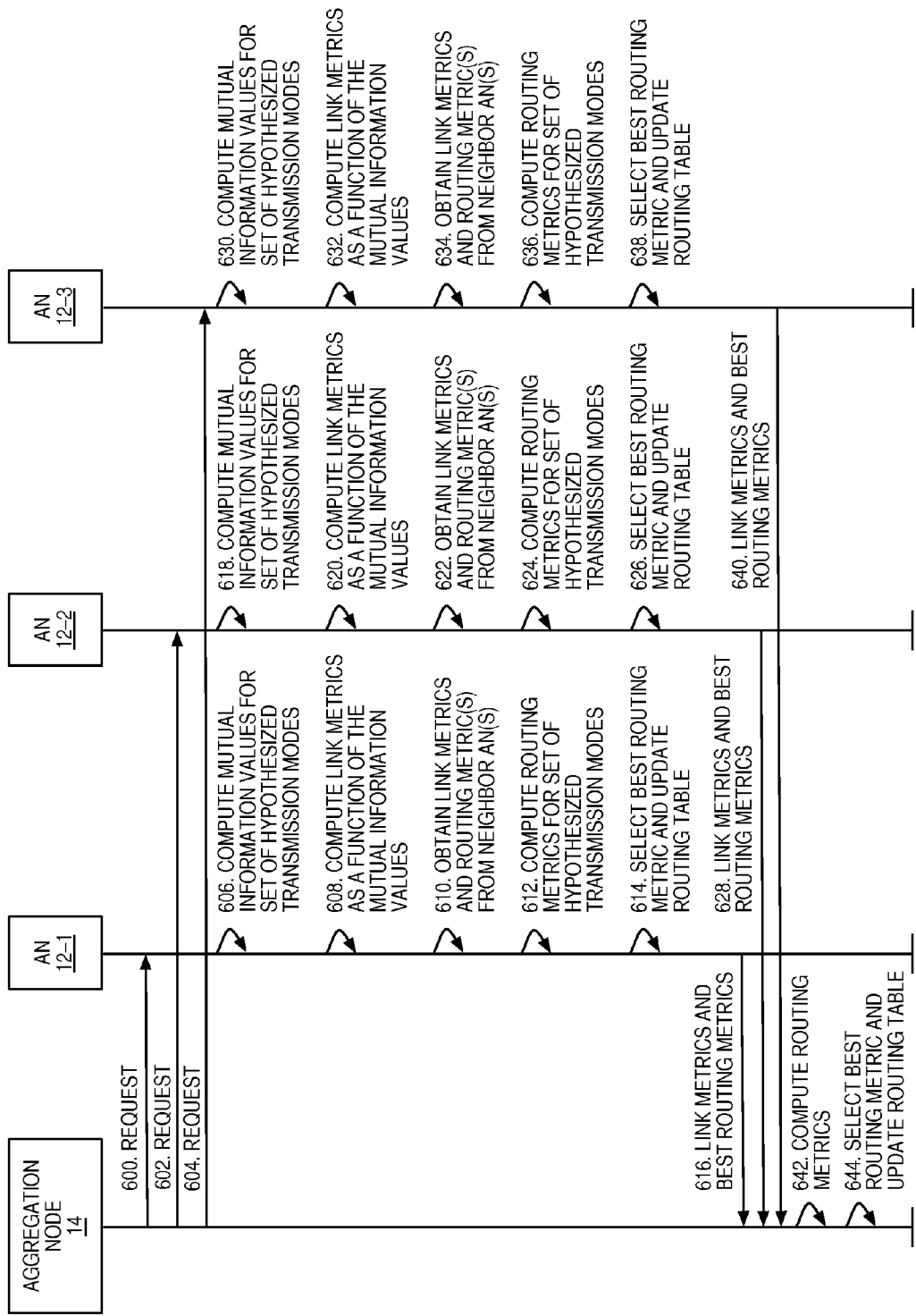
Figure 10:
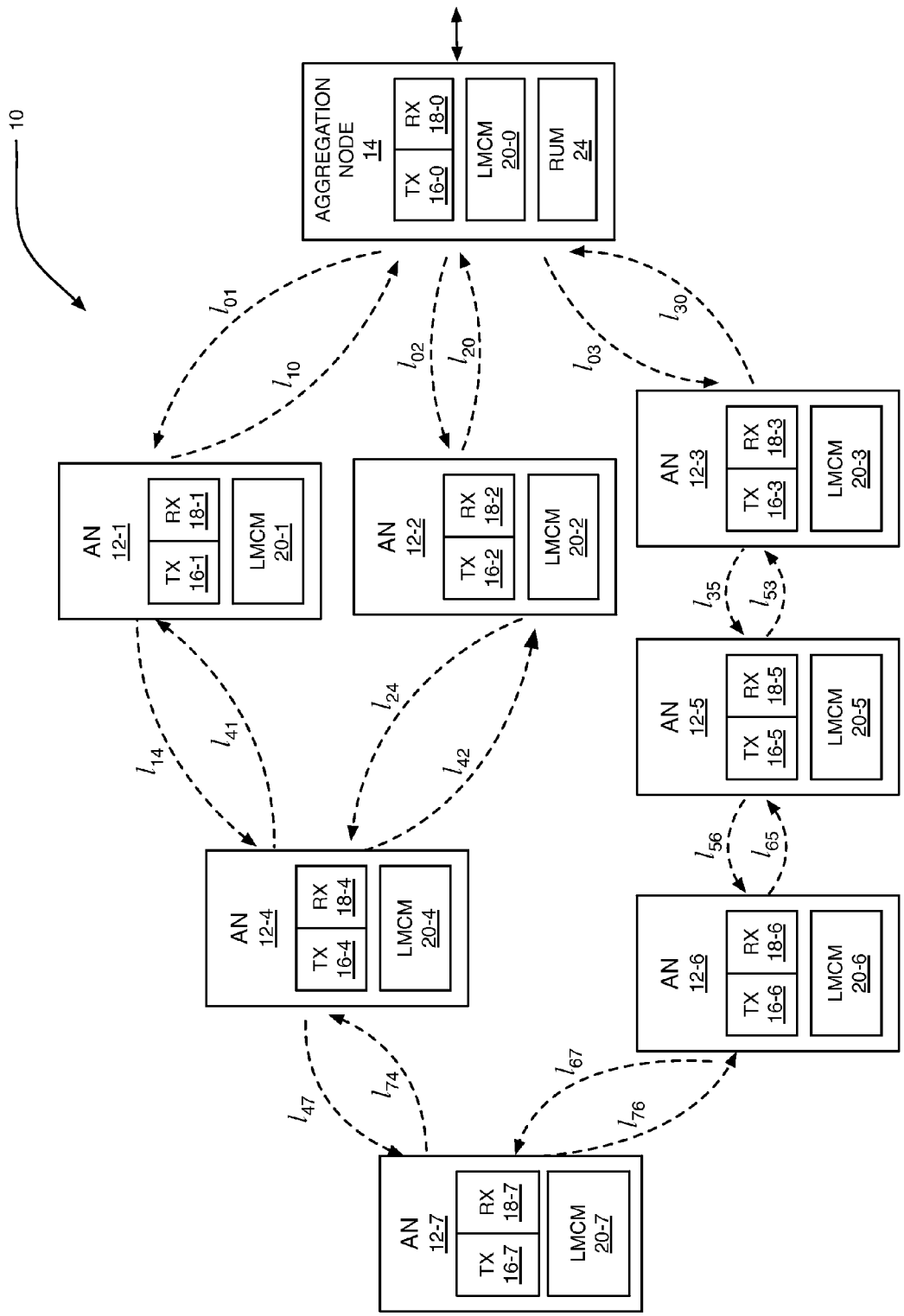
Figure 11:
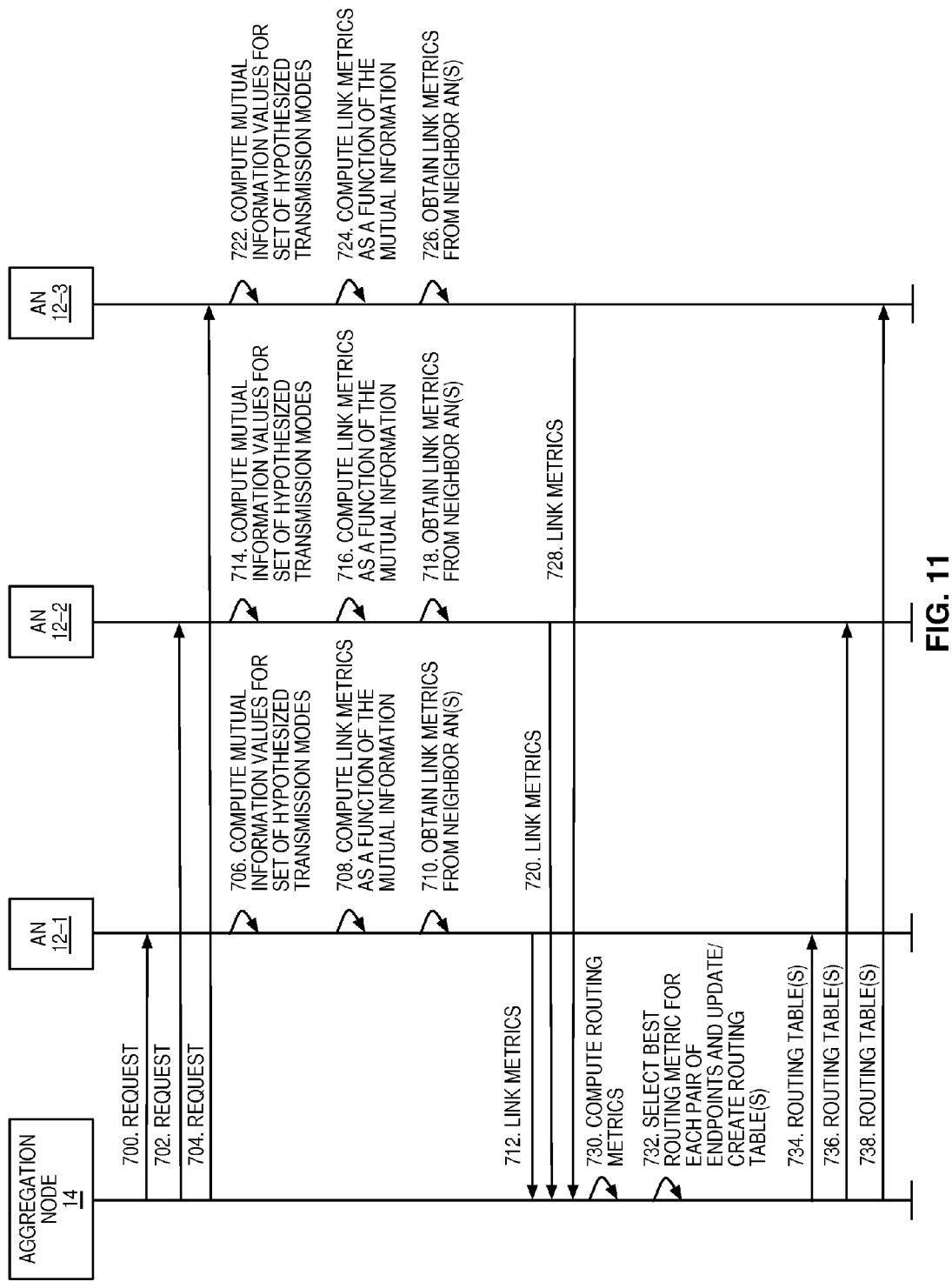
Figure 12:
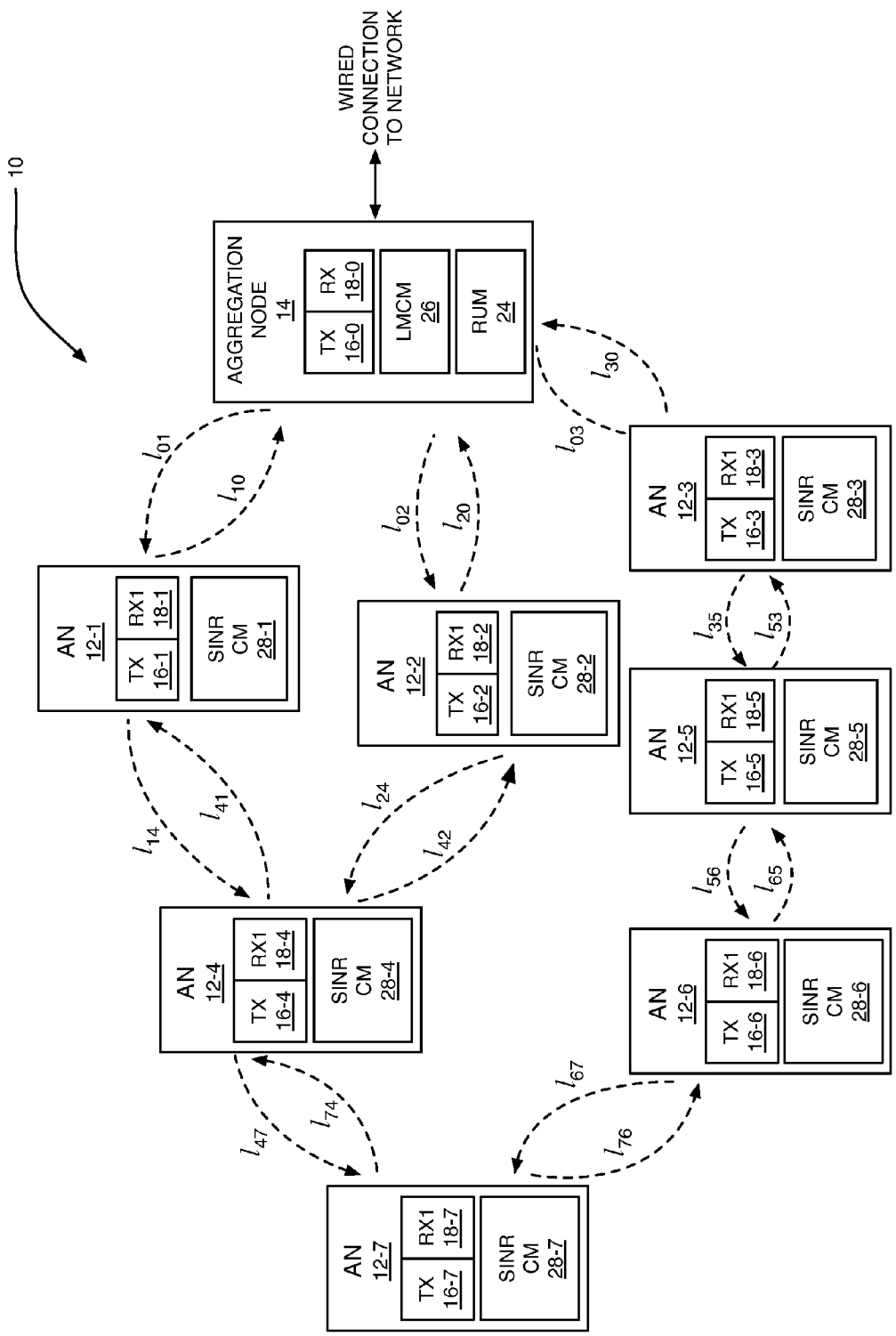
Figure 13:
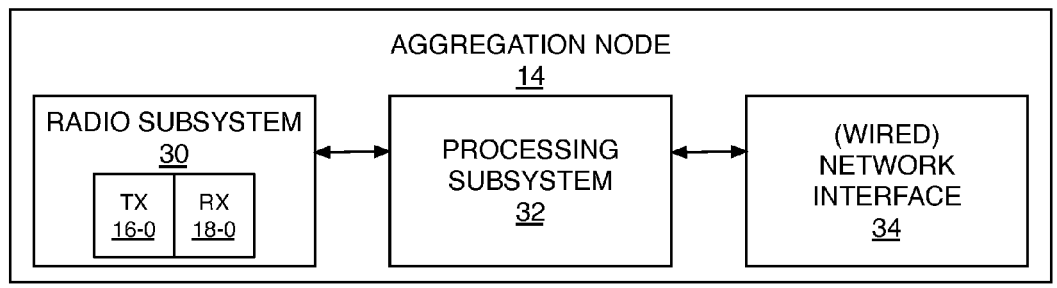
Figure 14:
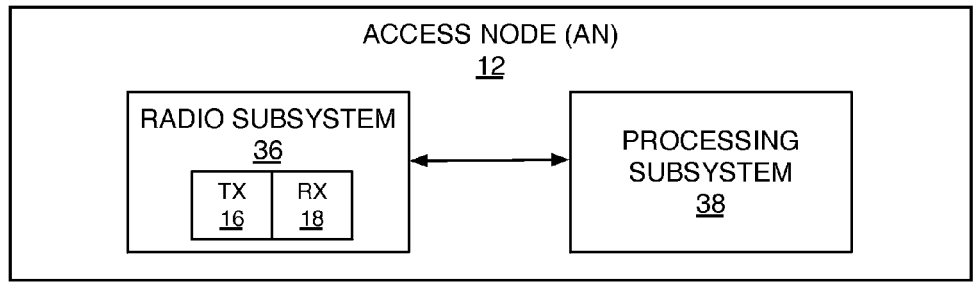

FIG. 3 is a flow chart that illustrates a process for computing link metrics for a link from a transmitter of a first access node in the wireless mesh backhaul network of FIG. 2 to a receiver of a second access node in the wireless mesh backhaul network of FIG. 2 as a function of mutual information for a number of different transmission modes for the link according to one embodiment of the present disclosure;

FIG. 4 is a flow chart that illustrates a process for utilizing the link metrics computed in the process of FIG. 3 to compute routing metrics for one or more routes that include the link and update a corresponding routing table(s) based on the routing metrics according to one embodiment of the present disclosure;

FIG. 5 is a flow chart that illustrates a more detailed process for computing the mutual information for the link for the different transmission modes based on Signal-to-Interference-plus-Noise Ratio (SINR) values computed for the different transmission modes according to one embodiment of the present disclosure;

FIG. 6 is a flow chart that illustrates a process for computing the SINR values for the different transmission modes according to one embodiment of the present disclosure;

FIG. 7 is a flow chart that illustrates a process for computing an estimate of noise-plus-interference covariance for the link for the different transmission modes according to one embodiment of the present disclosure;

FIG. 8 illustrates the wireless mesh backhaul network of FIG. 2 in which link computation and route updating functionality are implemented in a distributed manner according to one embodiment of the present disclosure;

FIG. 9 illustrates the operation of the wireless mesh backhaul network of FIG. 8 according to one embodiment of the present disclosure;

FIG. 10 illustrates the wireless mesh backhaul network of FIG. 2 in which link computation functionality is implemented in a distributed manner and route updating functionality is implemented in a centralized manner according to one embodiment of the present disclosure;

FIG. 11 illustrates the operation of the wireless mesh backhaul network of FIG. 10 according to one embodiment of the present disclosure;

FIG. 12 illustrates the wireless mesh backhaul network of FIG. 2 in which link computation and route updating functionality are implemented in a centralized manner according to one embodiment of the present disclosure;

FIG. 13 is a block diagram of the aggregation node of the wireless mesh backhaul network of FIGS. 2 and 8-12 according to one embodiment of the present disclosure; and FIG. 14 is a block diagram of one of the access nodes in the wireless mesh backhaul network of FIGS. 2 and 8-12 according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Before describing embodiments of the present disclosure in detail, a discussion of conventional routing metrics used to select desired routes in a wireless mesh network is beneficial. A wireless mesh network can be modeled as a directed graph $G \equiv (V,E)$, where V denotes the set of graph vertices, and E denotes the set of edges, each connecting two vertices in V. Each network node is then represented by a graph vertex $v \in V$, and each (potential) wireless link between two nodes is represented by an edge $e \in E$. Note that whenever no distinction between an access node and a wireless device (e.g., a user equipment) is necessary, the term "network node" is used to refer to any communication node in the network and, as such, can represent an access node, a wireless device, or any device capable of communicating with another device(s) in the network.

A route from a source network node (e.g., an aggregation node of a wireless backhaul network for a group of access nodes) to a destination access node (e.g., a user equipment or a distant access node) can be represented by a path P in the network, which is a sequence of vertices $\{v_i\}_{i=1}^{K}$ such that $v_i \in V$ for all i and $(v_i, v_{i+1}) \in E$ for all i=1, 2, ..., K−1, where K denotes the number of vertices on the path P, $v_1$ is the start vertex, and $v_K$ is the end vertex. For any given path P, define E(P) as the set of all edges $\{(v_i, v_{i+1})\}_{i=1}^{K-1}$ formed by adjacent vertices on the path P. Also let E* denote the set of all paths formed by the edges in E. For simplicity, vertices, edges, and paths will henceforth often (somewhat informally) be referred to as "nodes," "links," and "routes," respectively.

The quality of a route, or path, is measured by a routing metric $\mu: E^* \to \Re$ (i.e., $\mu$ is a real-valued function on $E^*$), where $\Re$ denotes the set of real values. The best route $P=\{v_i\}_{i=1}^{K}$ between a source node $v_1$ and a destination node $v_K$ is the route that yields the best routing metric $\mu(P)$ (i.e., the smallest or largest routing metric, depending on the particular routing metric). A routing metric $\mu(P)$ of a path P is often expressed as a simple function of the link metric w(l) assigned to each individual link l∈E(P) along the route P. For example, a hop-count metric of a path P is simply the total number of links in the path (i.e., $w_{hop\text{-}count}(P)=|E(P)|=\Sigma_{l \in E(P)} w_{hop\text{-}count}(l)$, where $w_{hop\text{-}count}(l)=1$, and a latency metric of a path P is simply the sum of the latencies of the individual links (i.e., $w_{latency}(P)=\Sigma_{l \in E(P)} w_{latency}(l)$). As another example, a throughput metric of a path P is the minimum (bottleneck) of the link bit rates along the path (i.e., $w_{bitrate}(P)=\min_{l \in E(P)} w_{bitrate}(l)$, where $w_{bitrate}(l)$ denotes the data rate supportable by a link l).

One of the most important criteria in route selection for wireless backhaul is to find the route that yields the largest possible data throughput for any particular network node. A key element in the design of routing metrics is therefore the data transmission rate supportable by the selected route, which in turns depends on the data rate supportable by each link between two adjacent network nodes along the route.

Most of the existing routing protocols/algorithms for wireless mesh networks utilize hop count as the routing metric. The use of such a routing metric minimizes the number of transmissions required to transport a data packet on the selected route or path. However, each link on the selected route tends to be a long-distance connection bordering at the fringe of connectivity and thus can support only a low data rate. Such a routing metric is suitable for network nodes that can only support a single fixed data rate. However, for more advanced network nodes that can support a variable data rate, a routing metric that takes into account the data rate supportable by each individual link of a route is highly desirable.

Several routing metrics that take into account the data rate of each link on a selected route have been proposed. For example, Georgios Parissidis, "Interference-Aware Routing Wireless Multihop Network," Doctoral Dissertation, DEA Universite Paris VI, 2008 (hereinafter the "Parissidis Dissertation") and R. Draves, J. Padhye, and B. Zill, "Routing in Multi-Radio Multi-hop Wireless Mesh Networks," ACM Mobicom, 2004 (hereinafter the "Draves Article") describe an Expected Transmission Time (ETT) routing metric, which is given by:

$$\mu_{ETT}(P) = \sum_{l \in E(P)} w_{ETT}(l) \text{ and } w_{ETT}(l) = \overline{N}(l) \frac{S_{packet}}{R(l)} \quad (1)$$

where $\overline{N}(l)$ denotes an expected number of transmissions for a successfully transmitted data packet for a link l, R(l) denotes a data rate of the link l, and $s_{packet}$ denotes a size of a data packet. Other variations of the ETT routing metric include Weighted Cumulative ETT (WCETT) as described in the Draves Article, Metric of Interference and Channel-switching (MIC) as described in Y. Yang, J. Wang, R. Kravets, "Designing Routing Metrics for Mesh Networks," Proc. IEEE Workshop on Wireless Mesh Networks, 2005 (hereinafter the "Yang Article"), and Medium Time Metric (MTM) as described in B. Awerbuch, D. Holmer, H. Ruberns, "High Throughput Route Selection in Multi-Rate Ad Hoc Wireless Networks," Technical Report, Johns Hopkins University, 2003 (hereinafter the "Awerbuch Report"). Several methods of estimating the link data rate R(l) for these routing metrics have been proposed. In the Draves Article, the link data rate is measured based on the ratio of the size of probing signals (or packets) and the time it takes to receive them. In the Yang Article and the Awerbuch Report, it was suggested to measure the data rate supportable by each individual link on a route by incrementally adjusting the data rate of a given link based on the number of previous successful transmissions as described in A. Kamerman and L. Monteban, "WaveLAN-II: A High-Performance Wireless LAN for the Unlicensed Band," Bell Labs Technical Journal, pp. 118-133, 1997 (hereinafter the "Kamerman Article"), or by assuming the highest possible data rate for a link that results in a bit error rate that falls below a certain threshold as described in G. Holland, N. Vaidya, and P. Bahl, "A Rate-Adaptive Protocol for Multi-Hop Wireless Networks," Proc. ACM MOBICOM 01, 2001 (hereinafter the "Holland Article").

The inventors have found that a main problem with the existing routing metrics that take link data rates into account is the lack of ability to predict the impact of an interfering network node on the routing metric without that network node actually transmitting. In a wireless backhaul network where signals transmitted by any network node are broadcast to all its neighboring network nodes, it would be very useful to be able to hypothesize the transmissions of the network nodes along a candidate route and to predict the resulting data rates of the associated links. As such, there is a need for systems and methods for computing a routing metric that would allow a routing protocol/algorithm to compare potential data throughputs among candidate routes. Moreover, most of the existing rate-dependent routing metrics also take a considerable amount of time and/or radio resources to collect a sufficient number of sample measurements in order to provide an accurate estimate of the link data rates. In addition, the existing routing metrics typically assume a single antenna and do not support multiple antennas or multiple stream transmission.

Systems and methods for providing wireless self-backhaul for a group of access nodes in a cellular communications network are described below. In one embodiment, link metrics for a link between a transmitter of a first network node and a receiver of a second network node in a wireless mesh network are computed as a function of mutual information for one or more hypothesized transmission modes. Routing metrics for one or more routes between a desired source network node and a desired destination network node are then computed based on the link metrics. Using these link metrics as well as similar link metrics for other links in the wireless mesh network, the best route between the desired source network node and the desired destination network node can be identified. In one preferred embodiment, the wireless mesh network is a wireless mesh network for self-backhaul for a group of access nodes in a cellular communications network.

In this regard, FIG. 2 illustrates a wireless mesh backhaul network 10 for a number of access nodes 12-1 through 12-7 (generally referred to herein collectively as access nodes 12 and individually as access node 12) providing access to a cellular communications network according to one embodiment of the present disclosure. As illustrated, each access node 12 has a wireless link (l), or a potential wireless link, between a transmitter of the access node 12 and a receiver of one or more neighboring access nodes 12 in the wireless mesh backhaul network 10. In this context, a neighboring access node 12 is another access node 12 with which the access node 12 is capable of establishing a wireless link (l). The wireless links are also simply referred to herein as links. The access nodes 12 are connected to an external network (e.g., a core network of the cellular communications network) via an aggregation node 14. As discussed below in detail, in order to enable the identification and selection of the best routes among network nodes in the wireless mesh backhaul network 10, link metrics are computed for the links (l) between the network nodes, where, for each link, the link metrics are estimates of a data rate for the link for one or more hypothesized transmission modes of a corresponding transmitter for the link and, in some preferred embodiments, a transmitter(s) of a neighboring network node(s) that interfere with the link. Using these link metrics, the best routes and the best transmission modes for the network nodes (i.e., the routes and the transmission modes that result in the highest throughput) are identified.

More specifically, for each link l and for each of one or more but preferably more than one hypothesized transmission modes m, a link metric w(l,m) for the link l for the transmission mode m is computed as a function of mutual information I(l,m) between a transmitter and a receiver for the link l for the transmission mode m. Note that the hypothesized transmission mode(s) may include an actual transmission mode. The mutual information I(l,m) is an estimate of a data rate R(l,m) supportable by the link (l) for the transmission mode m and, as discussed below, can be expressed as a function of Signal-to-Interference-plus-Noise Ratio (SINR). Using the link metrics for the links between the network nodes in the wireless mesh backhaul network 10, routing metrics μ(P) for potential routes, or paths, between a source network node and a destination network node can be computed. The route having the best routing metric can then be identified as a best, or desired, route between the source network node and the destination network node.

Specifically, the routing metric μ(P) over a route P may be computed as a function of the mutual information I(l,m) as follows:

$$\mu(P) = g(\{w(l,m)\}_{l \in E(P), m \in \pi_l}) \text{ where } w(l,m) \equiv f(I(l,m)), \quad (2)$$

where I(l,m) denotes the mutual information between the transmitter and the receiver of the link l for the m-th hypothesized transmission mode from a set $\pi_l$ of possible transmission modes among the network nodes in a neighborhood of the receiver of the link l (including the transmitter of link l), which is defined as:

$$I(l,m) \equiv \max_{p(X_m)} \int \int p(Y_m \mid X_m) p(X_m) \log_2 \left[ \frac{p(Y_m \mid X_m)}{p(Y_m)} \right] dX_m dY_m, \quad (3)$$

where $p(Y_m|X_m)$ denotes the transitional probability density function that characterizes the channel of the link l given that transmission mode $m \in \pi_l$ is used, $p(X_m)$ denotes the a priori input probability density or mass function for the channel of the link l given that transmission mode $m \in \pi_l$ is used, and the maximization is taken over all possible probability density or mass function $p(X_m)$. $X_m$ represents a signal transmitted by the transmitter of the link l, and $Y_m$ represents a signal received by the receiver of the link l. The mutual information represents a degree of correlation between the signal transmitted by the transmitter of the link l and the signal received by the receiver of the link l. The function g(·) in Equation (2) denotes a mapping from the link metrics $\{w(l,m)\}_{m \in \pi_l}$ for the set $\pi_l$ of transmission modes of the individual links l in the route P to the corresponding routing metric μ(P). For example, for a latency routing metric, the function g(·) can be expressed as:

$$\mu(P) = g(\{w(l,m)\}_{l \in E(P), m \in \prod_l}) = \sum_{l \in E(P)} \min_{m \in \prod_l} w(l,m) \quad (4)$$

where w(l,m) may denote the delay incurred by the transmission over the link l. For a data throughput routing metric that is limited by the throughput of the bottleneck rate, the function g(·) can be expressed as:

$$\mu(P) = g(\{w(l)\}_{l \in E(P)}) = \min_{l \in E(P)} \max_{m \in \prod_l} w(l,m) \quad (5)$$

where w(l) may denote the data throughput over the link l.

Each transmission mode in $\pi_l$ specifies a hypothesized transmission configuration (or a mixture of hypothesized transmission configurations) for the transmitter of the link l and the transmitters of one or more other links that can affect (i.e., interfere with) the link l. These other links are referred to as interfering links and may be links that actually interfere with the link l and/or links that potentially interfere with the link l. The other links that can interfere with the link l include links between transmitters and receivers of nearby access nodes 12 (e.g., between a neighboring access node 12 and another access node 12, which may or may not be a neighboring access node 12). The transmission configuration for the transmitter of the link l may specify, for example, a frequency band used by the transmitter for the link l, a transmit power level of the transmitter for the link l, a beamforming or precoding vector or modulation/coding scheme used by the transmitter for the link l, or the like, or any combination thereof. In the same manner, the transmission configuration for the transmitter of each of the interfering links may specify, for example, a frequency band used by the transmitter for the interfering link, a transmit power level of the transmitter for the interfering link, a beamforming or precoding vector or modulation/coding scheme used by the transmitter for the interfering link, or the like, or any combination thereof. Each transmission mode for the link l includes a different combination of transmission configurations for the link l and, preferably, the one or more interfering links.

Note that in a multi-subcarrier communications system, e.g. an Orthogonal Frequency Division Multiplex (OFDM)-based system such as Long Term Evolution (LTE), the link metric w(l,m) may depend on the data rates at multiple frequency subcarriers or time slots. In this case, w(l,m) may be a function of the mutual information I(l,m,f) computed for multiple frequencies or time slots. For example, the link metric w(l,m) may be a function of a statistical average of the mutual information I(l,m,f) over different frequencies defined as:

$$w(l,m) = f(\{I(l,m,f)\}_{f \in F}) = \tilde{f}\left(\frac{1}{|F|} \sum_f I(l,m,f)\right) \quad (6)$$

where F denotes a set of frequency subcarriers that the link l utilizes and |F| denotes of number of subcarriers in the set F. When |F| is large, it is known that the quantity $|F|^{-1} \Sigma_f I(l,m)$ converges to the so-called ergodic capacity of the channel of the link l, which is independent of the frequency and depends only on the long-term statistics of the channel instead of its instantaneous response. For simplicity of descriptions, in this disclosure, the description focuses on a single frequency and a single time slot (or a single channel use in general), but it should be understood by those skilled in the art that the generalization of the systems and methods disclosed herein to the case with multiple frequencies or time slots is straightforward.

Note that the mutual information is an instantaneous value assuming that the channel state information is instantaneous. Equation (6) gives one way in which mutual information may be averaged in a multi-subcarrier communications system. However, the mutual information may be averaged over frequency and/or time regardless of the type of wireless communication in order to obtain more stable mutual information values.

In one embodiment, the transmitter and the receiver of the access nodes 12 for a particular link l each has a single antenna, the link l includes a single data stream, and both noise and interference on the link l are modeled as Gaussian distributed random processes. In this case, the mutual information I(l,m) of Equation (3) reduces to:

$$I(l,m) = \log_2(1+\text{SINR}(l,m)) \equiv D_1(\text{SINR}(l,m)) \quad (7)$$

where $\text{SINR}(l,m) \equiv p_{l,m} g_l/q_{l,m}$ is the SINR for the link l for the transmission mode m, $p_{l,m}$ denotes a transmit power of the transmitter for the link l for transmission mode m, $$q_{l,m} \equiv \sigma_l^2 + \sum_{l' \in N_l} p_{l',m} g_{l'} \quad (8)$$

is a power level for noise-plus-interference for the link 1 and transmission mode m, $\sigma_l^2$ denotes a noise power at the receiver of the link l, $g_l$ denotes a channel gain of the link l, and $\mathcal{N}_l \subset E$ denotes a set of all neighboring links of the link l that interfere with the link l. In addition, when a finite modulation constellation is used for the channel input $X_m$, the mutual information I(l,m) reduces to:

$$I(l,m) = \log N - \frac{1}{N} \sum_{s_1 \in \Lambda} \int \frac{e^{-|z|^2/2}}{2\pi} \log_2 \quad (9)$$

$$\sum_{s_2 \in \Lambda} e^{-\text{SINR}(l,m)|s_1-s_2|^2/2} e^{-\sqrt{\text{SINR}(l,m)} \, \text{Re}\{z^*(s_1-s_2)\}} dz$$

$$\equiv D_1^\Lambda(\text{SINR}(l,m))$$

where $\Lambda$ denotes a set of complex-valued modulation constellation points.

In another embodiment, the transmitter and/or the receiver for the link l has multiple antennas and the link l has a single data stream. In this embodiment, the mutual information I(l, m) of Equation (3) can be expressed using Equation (4) or Equation (5) but where the SINR is given by:

$$\text{SINR}(l,m) \equiv p_{l,m}^H H_l^H Q_{l,m}^{-1} H_l p_{l,m} \quad (10)$$

where $p_{l,m} = (p_{l,m}^{(1)}, p_{l,m}^{(2)}, \ldots, p_{l,m}^{(n_{T,l})})^T$ is a precoding vector whose elements specify an antenna weight (which in turn determines a transmit power and a relative phase shift) assigned to each of a number $n_{T,l}$ of transmit antennas of the transmitter of the link l for transmission mode m, $H_l$ is a $n_{R,l}$-by-$n_{T,l}$ channel response matrix whose elements specify a complex-valued channel gain from each antenna of the transmitter of the link l to each antenna of the receiver of the link l, $$Q_{l,m} \equiv Q_{noise} + \sum_{l' \in N_l} H_{l'} p_{l',m} p_{l',m}^H H_{l'}^H \quad (11)$$

denotes a noise-plus-interference covariance matrix, and $Q_{noise}$ is a covariance matrix of noise.

In yet another embodiment, the transmitter and the receiver of the link l each include multiple antennas and the link l includes multiple data streams. Further, in one embodiment, for each of the data streams, the receiver of the link l is equipped with the ability to successively cancel interference caused by the other data streams transmitted by the transmitter of the link l, and the mutual information I(l,m) can be expressed as:

$$I(l,m) = \log\det(I + P_{l,m}^H H_l^H Q_{l,m}^{-1} H_l P_{l,m}) \quad (12)$$

$$= \sum_{i=1}^{n_S(l,m)} D_1(\text{SINR}^{(i)}(l,m))$$

where $$D_1(\text{SINR}^{(i)}(l,m)) \equiv \log_2(1+\text{SINR}^{(i)}(l,m)) \quad (13)$$

denotes the mutual information value for the i-th data stream communicated over the link l for the hypothesized transmission mode, and further where I is an identity matrix of size $n_{R,l}$-by-$n_{R,l}$, $\log(\cdot)$ is a logarithm function, $\det(X)$ denotes the determinant of the matrix X, $P_{l,m} = (p_{l,m,1}, p_{l,m,2}, \ldots, p_{l,m,n_s(l,m)})$ is a precoding matrix for the link l for the hypothesized transmission mode m with each column $p_{l,m,i}$ corresponding to a precoding vector for one of a number $n_s(l,m)$ of data streams transmitted from the transmitter for the link l for the transmission mode m, $H_l$ is a $n_{R,l}$-by-$n_{T,l}$ channel response matrix whose elements specify a complex-valued channel gain from each of a number $n_{T,l}$ of antennas of the transmitter of the first network node to each of a number $n_{R,l}$ of receive antennas of the receiver of the second network node for the link l, $Q_{l,m}$ is the noise-plus-interference covariance matrix given in Equation (11), $$\text{SINR}^{(i)}(l,m) \equiv p_{l,m,i}^H H_l^H Q_{l,m,i}^{-1} H_l p_{l,m,i} \quad (14)$$

is a per-stream SINR for the i-th data stream of the link l and transmission mode m, and where:

$$Q_{l,m,i} \equiv Q_{l,m} + \sum_{j>i} H_l p_{l,m,j} p_{l,m,j}^H H_l^H \quad (15)$$

$$= Q_{noise} + \sum_{l' \in N_l} H_{l'} p_{l',m} p_{l',m}^H H_{l'}^H + \sum_{j>i} H_l p_{l,m,j} p_{l,m,j}^H H_l^H$$

is a per-stream noise-plus-interference covariance matrix for the i-th data stream of the link l and transmission mode m. If a finite modulation constellation $\Lambda$, e.g. the Quadrature Amplitude Modulation (QAM) constellation, is used, $D_1^\Lambda(\text{SINR}^{(i)}(l,m))$ may be used in place of $D_1(\text{SINR}^{(i)}(l,m))$ in Equation (12).

If, for each of the data streams, the receiver for the link l does not cancel the other data streams transmitted by the transmitter for the link l, the mutual information I(l,m) can also be expressed as:

$$I(l, m) = \sum_{i=1}^{n_S(l,m)} D_1(SINR^{(i)}(l, m)) \quad (16)$$

where $SINR^{(i)}(l,m)$ is the per-stream SINR for the i-th data stream of the link l and transmission mode m given in Equation (14) but the per-stream noise-plus-interference covariance matrix $Q_{l,m,i}$ in Equation (14) is now defined as:

$$Q_{l,m,i} \equiv Q_{l,m} + \sum_{j \neq i} H_l p_{l,m,j} p_{l,m,j}^H H_l^H \quad (17)$$
$$= Q_{noise} + \sum_{l' \in N_l} H_{l'} p_{l',m} p_{l',m}^H H_{l'}^H + \sum_{j \neq i} H_l p_{l,m,j} p_{l,m,j}^H H_l^H.$$

By being a function of the mutual information $I(l,m)$, the link metric $w(l,m)$ of Equation (2) provides a good estimate of data rate for the link l for transmission mode m. Further, by hypothesizing multiple different transmission modes m, different link metrics $w(l,m)$ for the different transmission modes m can be computed. Further, as described below, the link metrics $w(l,m)$ for the different transmission modes m for all of the links l in a route P can be utilized to compute the routing metrics $\mu(P)$ for the route P for the different transmission modes m of the links l in the route P. Then, using the routing metrics for different routes between a desired source network node (e.g., the aggregation node 14) and a desired destination node (e.g., one of the access nodes 12), a route P with the best routing metric $\mu(P)$ can be identified and selected as the best, or desired, route from the desired source node to the desired destination node. Further, the best route also identifies the best transmission mode m for each link l in that route.

In this regard, FIG. 3 is a flow chart that illustrates a process for computing the link metrics $w(l,m)$ for a link l for each m in a set of transmission modes from a transmitter of a first network node (e.g., the aggregation node 14 or one of the access nodes 12) to the receiver of a second network node (e.g., one of the access nodes 12) and then providing the link metrics $w(l,m)$ to a Routing Update Module (RUM) according to one embodiment of the present disclosure. This process is performed by a network node associated with the wireless mesh backhaul network 10. In one embodiment, this process is performed by a Link Metric Computation Module (LMCM) at a network node that provides centralized link metric computation funcationality. In another embodiment, this process is performed by a LMCM at the second network node in a distributed LMCM embodiment.

First, the mutual information $I(l,m)$ for the link l is computed for each m in a set of transmission modes (step 100). The set of transmission modes m may be all possible transmission modes m for the link l or some subset thereof. The set of transmission modes m is also referred to herein as a set of hypothesized transmission modes m, which may include an actual transmission mode for the link l. The set of transmission modes m preferably includes multiple transmission modes m such that the mutual information $I(l,m)$ is computed for multiple different transmission configurations for the transmitter of the link l and the transmitter(s) of the neighboring, or interfering, link(s) for the link l. In general, the mutual information $I(l,m)$ is computed based on Equation (3). However, as discussed above and illustrated in Equations (7)-(16), the mutual information $I(l,m)$ can be computed as a function of SINR.

Next, link metrics $\{w(l,m)\}_{m \in \pi_l}$ are computed for the link l for the set $\pi_l$ of transmission modes as a function of the mutual information $I(l,m)$ computed in step 100 (step 102). More specifically, as discussed above with respect to Equation (2), the link metric $w(l,m)$ for the link l for a particular transmission mode m is computed as a function $f(\cdot)$ of the mutual information $I(l,m)$ for the link l for the transmission mode m. The function $f(\cdot)$ can be any desired function and, in general, can be used to place practical limitations on the theoretical maximum data rate represented by the mutual information $I(l,m)$. As one example, the function $f(\cdot)$ may multiply the mutual information $I(l,m)$ by a scaling factor in the range of greater than 0 to less than or equal to 1 (e.g., $f(I(l,m))=0.8 \cdot I(l,m)$). As another example, the function $f(\cdot)$ may return the lesser of a predefined upper limit for the link metric $w(l,m)$ and the mutual information $I(l,m)$ (i.e., $f(I(l,m))=\min(\text{upper\_limit\_value}, I(l,m))$). Lastly, the link metrics $w(l,m)$ for the link l for the set of transmission modes m are provided to the RUM (step 104). As discussed below, the RUM then utilizes the link metrics to compute routing metrics for one or more routes that include the link l.

FIG. 4 is a flow chart that illustrates a process for computing routing metrics utilizing the link metrics computed in FIG. 3 and utilizing the routing metrics to update a routing table according to one embodiment of present disclosure. This process is performed by the RUM, which can be implemented in a centralized or a distributed manner. First, the link metrics $\{w(l,m)\}_{m \in \pi_l}$ for the link l between the transmitter of the first network node and the receiver of the second network node for the set $\pi_l$ of transmission modes are obtained (step 200). In this embodiment, the link metrics $\{w(l,m)\}_{m \in \pi_l}$ are obtained from the LMCM operating according to the process of FIG. 3. Next, the RUM computes routing metics $\mu(P)$ for one or more routes P that include the link l based on the link metrics $\{w(l,m)\}_{m \in \pi_l}$ obtained for the link l and the set $\pi_l$ of transmission modes for the link l (step 202). As discussed above with respect to Equation (2), the routing metrics $\mu(P)$ for a route P are computed as a function $g(\cdot)$ of the link metrics $\{w(l,m)\}_{m \in \pi_l}$ for the links l in the route P. Again, the function $g(\cdot)$ denotes a mapping from the link metrics $\{w(l,m)\}_{m \in \pi_l}$ of the links l in the route P to the corresponding routing metric $\mu(P)$. The function $g(\cdot)$ may be any suitable function for the mapping. Some non-limiting examples are provided above in Equations (4) and (5).

Once the routing metrics $\mu(P)$ for the one or more routes P are computed in step 202, a routing table for the first network node is updated based on the routing metrics $\mu(P)$ (step 204). More specifically, the routing table for the first network node is updated to reflect the best route(s) from source node(s) to destination node(s) in the wireless mesh backhaul network 10. Lastly, in this embodiment, the routing table is then provided to the first network node (step 206). Providing the routing table may be implemented as providing a complete, or entire, routing table of the first network node to the first network node or providing an update to the routing table of the first network node to the first network node.

As discussed above, in some preferred embodiments, the mutual information, and thus the link metrics, are computed based on SINR. More specifically, in order to estimate the link data rate of a link l as part of the routing metric computation (i.e., in order to compute the mutual information for the link l as part of the routing metric computation process), the receiving network node of the link l computes $SINR(l,m)$ for the link and each of the hypothesized transmission modes $m \in \pi_l$. In order to compute $SINR(l,m)$, the network node in turn needs to know certain channel information (e.g., the channel response matrix $H_l$ or the channel gain $g_l$) about the link l as well as certain noise-plus-interference covariance information (e.g., the noise-plus-interference covariance matrix $Q_{l,m}$ or just the noise-plus-interference covariance power $q_{l,m}$). In the special case when the set $\pi_l$ is a singleton that corresponds to the actual transmission mode currently utilized, the matrix $Q_{l,m}$ (or $q_{l,m}$ in the single antenna case) can be measured directly over the received signal. However, in the more general case when the set $\pi_l$ contains one or more hypothesized transmission modes that are not currently being adopted, the matrix $Q_{l,m}$ also needs to be computed based on the channel information of the neighboring, or interfering, links of the link l in the set $\mathcal{N}_l$, which is assumed to be determined in the initial setup phase of, and periodically maintained by, the receiving node of the link l.

In this regard, FIGS. 5-7 are flow charts that illustrate processes for computing the link metrics $\{w(l,m)\}_{m\in\pi_l}$ in step 102 of FIG. 3 based on SINR values according to one embodiment of the present disclosure. As illustrated in FIG. 5, the link metrics $\{w(l,m)\}_{m\in\pi_l}$ for the link l for the set of $\pi_l$ transmission modes are computed by first computing SINR values for the link l for the set $\pi_l$ of transmission modes (step 300). For embodiments where there the link l includes a single data stream, the SINR values are SINR values for the link l. However, for embodiments where the link l includes multiple data streams, the SINR values are per-stream SINR values. The mutual information I(l,m) for the link l for each m in the set $\pi_l$ of transmission modes is then computed as a function of the SINR values computed in step 300 (step 302). More specifically, the mutual information I(l,m) can be computed based on the SINR values as described above with respect to Equations (7)-(16).

FIG. 6 illustrates step 300 of FIG. 5 in more detail according to one embodiment of the present disclosure. In order to compute the SINR values for the link l for the set $\pi_l$ of transmission modes, channel information, or channel state information, for the link l is estimated (step 400). The channel information may be instantaneous or statistically averaged over time and/or frequency (e.g., over multiple time slots or frequency subcarriers in a multi-subcarrier system). The channel information includes a channel response and/or a channel gain for the channel. Notably, the channel information can be estimated using any suitable channel estimation technique. In addition, the noise-plus-interference covariance for the link l for each m in the set $\pi_l$ of transmission modes is estimated (step 402). The noise-plus-interference covariance can be estimated using any suitable noise-plus-interference covariance estimation technique. The SINR values for the link l for the set $\pi_l$ of transmission modes are then computed based on the estimate of the channel information and the estimate of the noise-plus-interference covariance from steps 400 and 402 (step 404). More specifically, the SINR values may, for example, be computed according to Equation (10) while the noise-plus-interference covariance may be computed according to Equation (11) for multi-antenna transmission of single data-stream. For multiple data-stream, the SINR values may be computed according to Equation (14), while the noise-plus-interference covariance may be computed according to Equation (15) or (17) depending on the receiver capability.

FIG. 7 is a flow chart that illustrates step 402 of FIG. 6 in more detail according to one embodiment of the present disclosure. First, channel information for the neighboring, or interfering, links for the link l is estimated (step 500). The channel information may be instantaneous or statistically averaged over time and/or frequency (e.g., over multiple time slots or frequency subcarriers in a multi-subcarrier system). The channel information includes a channel response and/or channel gain for the channel. Notably, the channel information can be estimated using any suitable channel estimation technique. The noise-plus-interference covariance is then computed as the sum of signal covariances of all of the neighboring links, the noise covariance, and (if applicable) inter-stream interference covariance (step 502).

FIG. 8 illustrates the wireless mesh backhaul network 10 wherein the LMCM and the RUM functionality are distributed among the network nodes according to one embodiment of the present disclosure. As illustrated, the access nodes (ANs) 12-1 through 12-7 include corresponding transmitters (TXs) 16-1 through 16-7, receivers (RXs) 18-1 through 18-7, LMCMs 20-1 through 20-7, and RUMs 22-1 through 22-7. Likewise, the aggregation node 14 includes a transmitter 16-0, a receiver 18-0, a LMCM 20-0, and a RUM 22-0. The transmitters 16-0 through 16-7 are generally referred to herein collectively as transmitters 16 of the corresponding network nodes and individually as a transmitter 16 of the corresponding network node, the receivers 18-0 through 18-7 are generally referred to herein collectively as receivers 18 of the corresponding network nodes and individually as a receiver 18 of the corresponding network node, the LMCMs 20-0 through 20-7 are generally referred to herein collectively as LMCMs 20 of the corresponding network nodes and individually as a LMCM 20 of the corresponding network node, and the RUMs 22-0 through 22-7 are generally referred to herein collectively as RUMs 22 of the corresponding network nodes and individually as a RUM 22 of the corresponding network node.

In this embodiment, the LMCMs 20 operate to compute the link metrics $\{w(l,m)\}_{m\in\pi_l}$ for the corresponding links l and the RUMs 22 operate to compute the routing metrics $\mu(P)$ in a distributed manner. In this regard, FIG. 9 illustrates the operation of the wireless mesh backhaul network 10 of FIG. 8 according to one embodiment of the present disclosure. Notably, in FIG. 9, the operation of the wireless mesh backhaul network 10 is described with respect to the aggregation node 14 and the access nodes 12-1, 12-2, and 12-3 to (and from) which the aggregation node 14 has links l. However, this discussion is equally applicable to the other network nodes in the wireless backhaul mesh network 10.

As illustrated, the aggregation node 14 sends requests to the aggregation nodes 12-1, 12-2, and 12-3 to determine the best route from the aggregation node 14 to a desired destination node (e.g., the access node 12-7) (steps 600-604). Looking first at the aggregation node 12-1, in response to the request, the LMCM 20-1 of the aggregation node 12-1 computes the mutual information I(l,m) for the link l from the transmitter 16-0 of the aggregation node 14 to the receiver 18-1 of the access node 12-1, which is denoted as link $l_{01}$, for each m in a set $\pi_{l_{01}}$ of hypothesized transmission modes for the link $l_{01}$ in the manner described above (step 606). The set $\pi_{l_{01}}$ of hypothesized transmission modes for the link $l_{01}$ may be specified in the request sent to the access node 12-1 in step 600. The LMCM 20-1 of the access node 12-1 computes the link metrics $w(l_{01},m)$ for the link $l_{01}$ for each m in the set $\pi_{l_{01}}$ of hypothesized transmission modes for the link $l_{01}$ as a function of the mutual information $I(l_{01},m)$ for the link $l_{01}$ for each m in the set $\pi_{l_{01}}$ of hypothesized transmission modes for the link $l_{01}$ in the manner described above (step 608).

The access node 12-1 also obtains link metrics w(l,m) for the link(s) from the transmitter 16-1 of the access node 12-1 to the receiver(s) 18 of any neighboring access nodes 12 of the access node 12-1 for each m in a corresponding set(s) of hypothesized transmission modes for those links as well as routing metrics $\mu(P)$ computed by the RUM(s) 22 of the neighboring access nodes 12 (step 610). In general, in step 610, the access node 12-1 obtains information needed by the RUM 22-1 to compute routing metrics for one or more routes from the access node 12-1 to the desired destination node. Using the example of FIG. 9, the access node 12-1 obtains, from the access node 12-4, link metrics w(l,m) for the link $l_{14}$ from the transmitter 16-1 of the access node 12-1 to the receiver 18-4 of the access node 12-4 computed by the LMCM 20-4 of the access node 12-4. In addition, in this embodiment, the access node 12-1 obtains routing metrics $\mu(P)$ computed by the RUM 22-4 of the access node 12-4 for one or more routes from the access node 12-4 to the desired destination node. The access node 12-1 may additionally or alternatively obtain, from the access node 12-4, link metrics computed by downstream LMCMs 20 (e.g., the LMCM 20-7) for link(s) in paths from the access node 12-4 to the desired destination node.

The RUM 20-1 computes the routing metrics $\mu(P)$ for one or more routes, or paths, from the access node 12-1 to the desired destination node as a function of the link metrics w(l,m) obtained for the link(s) from the transmitter 16-1 of the access node 12-1 to the receiver(s) 18 of the neighboring access node(s) 12 for the corresponding set(s) of transmission mode(s) for those link(s) and the routing metric(s) obtained from the RUM(s) 22 of the neighboring access node(s) 12 (step 612). In this embodiment, the RUM 22-1 selects the route having the best routing metric $\mu(P)$ and updates a routing table for the transmitter 16-1 of the access node 12-1 (step 614). In this embodiment, the RUM 22-1 also sends the link metrics $w(l_{01},m)$ computed in step 608 for the link $l_{01}$ from the transmitter 16-0 of the aggregation node 14 to the receiver 18-1 of the access node 12-1 and the best routing metric selected in step 614 to the aggregation node 14 (step 616). The access nodes 12-2 and 12-3 respond to the requests of steps 602 and 604 in the same manner (steps 618-640).

Based on the link metrics and routing metrics received from the access nodes 12-1, 12-2, and 12-3, the RUM 22-0 of the aggregation node 14 computes routing metrics for the routes from the aggregation node 14 to the desired destination node in the wireless mesh backhaul network 10 (step 642). The RUM 22-0 selects the route having the best routing metric as the desired, or best, route from the aggregation node 14 to the desired destination node and updates a routing table of the aggregation node 14 accordingly (step 644).

FIG. 10 illustrates the wireless mesh backhaul network 10 wherein the RUM functionality is centralized at the aggregation node 14 according to one embodiment of the present disclosure. In particular, the RUMs 22 of FIG. 9 are replaced with a centralized RUM 24 that, in this embodiment, is implemented at the aggregation node 14. Note, however, that the RUM 24 can alternatively be implemented at a different node in or otherwise associated with the wireless mesh backhaul network 10.

FIG. 11 illustrates the operation of the wireless mesh backhaul network 10 of FIG. 10 according to one embodiment of the present disclosure. In general, the RUM 24 obtains the link metrics w(l,m) for the links l in one or more routes for each m in corresponding sets of hypothesized transmission modes for those links l and computes routing metrics $\mu(P)$ for the routes based on the corresponding link metrics w(l,m) for the hypothesized transmission modes m for the links l in the routes. In this embodiment, the RUM 24 of the aggregation node 14 sends requests to the access nodes 12-1, 12-2, and 12-3 to which the aggregation node 14 has links l (steps 700-704). In response to the request, the LMCM 20-1 of the access node 12-1 computes the mutual information I(l,m) for the link l from the transmitter 16-0 of the aggregation node 14 to the receiver 18-1 of the access node 12-1, which is denoted link $l_{01}$, for the set of hypothesized transmission modes m for the link $l_{01}$ in the manner described above (step 706). The set of hypothesized transmission modes m for the link $l_{01}$ may be specified in the request sent to the access node 12-1 in step 700. The LMCM 20-1 of the access nodes 12-1 computes the link metrics $w(l_{01},m)$ for the link $l_{01}$ for each m in the set of hypothesized transmission modes for the link $l_{01}$ as a function of the mutual information $I(l_{01},m)$, for the link $l_{01}$ for the set of hypothesized transmission modes m for the link $l_{01}$ in the manner described above (step 708).

The access node 12-1 also obtains link metrics w(l,m) for downstream links from the neighboring access node(s) 12 of the access node 12-1 (step 710). The downstream links include the link(s) from the transmitter 16-1 of the access node 12-1 to the receiver(s) 18 of the neighboring access node(s) 12 of the access node 12-1, link(s) from the transmitter(s) 16 of the neighboring access node(s) 12 of the access node 12-1 to the receiver(s) 18 of its(their) neighboring access node(s) 12, and so on. Thus, using the example of FIG. 9, the access node 12-1 obtains, from the access node 12-4, link metrics $w(l_{14},m)$ for the link $l_{14}$ from the transmitter 16-1 of the access node 12-1 to the receiver 18-4 of the access node 12-4 computed by the LMCM 20-4 of the access node 12-4 for the set of hypothesized transmission modes m for the link $l_{14}$ as well as link metrics $w(l_{47},m)$ for the link $l_{47}$ from the transmitter 16-4 of the access node 12-4 to the receiver 18-7 of the access node 12-7 computed by the LMCM 20-7 of the access node 12-7 for each m in the set of hypothesized transmission modes for the link $l_{47}$. The access node 12-1 returns the link metrics computed in step 708 as well as the link metrics obtains in step 710 to the aggregation node 14 (step 712). In the same manner, the access nodes 12-2 and 12-3 compute and obtain link metrics for the links $l_{02}$, $l_{24}$, $l_{03}$, $l_{35}$, $l_{56}$, and $l_{67}$ for corresponding sets of hypothesized transmission modes m for those links and returns the link metrics to the aggregation node 14 (steps 714-728).

The RUM 24 at the aggregation node 14 then computes the routing metrics $\mu(P)$ for different routes between one or more pairs of source/destination nodes (i.e., pairs of endpoints) based on the link metrics for the links in those routes in the manner described above (step 730). For each source and destination node pair, the RUM 24 selects the route between the source and destination nodes having the best routing metric as the best route for that source and destination node pair and updates or creates a corresponding routing table(s) (step 732). Note that the best routing metric not only identifies the best route, or path, from the source node to the destination node but also identifies the best transmission mode for each link. The RUM 24 may, for example, maintain a single routing table for all routes for all of the network nodes or may maintain a separate routing table for each access node 12.

Lastly, the RUM 24 then provides the routing table(s) to the access nodes 12-1, 12-2, and 12-3 (steps 734-738). In one embodiment, the RUM 24 maintains a separate routing table for each of the access nodes 12. In this embodiment, the RUM 24 sends the routing tables to the corresponding access nodes 12. In another embodiment, the RUM 24 maintains a single routing table that it then distributes to all of the access nodes 12.

FIG. 12 illustrates the wireless mesh backhaul network 10 wherein the RUM functionality and the LMCM functionality is centralized at the aggregation node 14 according to one embodiment of the present disclosure. In particular, the LMCMs 20 and the RUMs 22 of FIG. 8 are replaced with a centralized LMCM 26 and the centralized RUM 24, respectively. The centralized LMCM 26 and the centralized RUM 24 are, in this embodiment, implemented at the aggregation node 14. Note, however, that the LMCM 26 and the RUM 24 can alternatively be implemented at a different node in or otherwise associated with the wireless mesh backhaul network 10.

The wireless mesh backhaul network 10 of FIG. 12 operates in a manner similar to that illustrated and described with respect to FIG. 11. However, in this embodiment, SINR values to be used for computing the mutual information and ultimately the link metrics are determined by SINR computation modules (CMs) 28-1 through 28-7 (generally referred to herein collectively as SINR CMs 28 and individually as SINR CM 28). The SINR CMs 28 can compute the SINR values using, for example, the process of FIG. 6. Once computed, the SINR CMs 28 return the SINR values to the LMCM 26. Based on the SINR values, the LMCM 26 computes the link metrics for the hypothesized transmission modes m for the links l. Using the link metrics, the RUM 24 computes the desired route metrics and, based on the route metrics, identifies the best route between one or more pairs of source and destination network nodes.

Note that the examples given herein regarding creating, updating, and distributing the routing tables are only examples and should not be construed as limiting the scope of the present disclosure. Other mechanisms for creating, updating, and distributing routing tables may be used. In other words, the link metrics and routing metrics and the systems and methods for computing the link metrics and routing metrics disclosed herein are not limited to any particular scheme for creating, updating, and distributing the resultant routing tables. Any suitable scheme may be used. Further, while the discussion herein is focused on the wireless mesh backhaul network 10, the link metrics and routing metrics disclosed herein are equally applicable to any type of wireless mesh network and are particularly beneficial in wireless mesh networks in which it is desirable to take interference between links into consideration when computing corresponding link metrics.

FIG. 13 is a block diagram of the aggregation node 14 according to one embodiment of the present disclosure. As illustrated, the aggregation node 14 includes a radio subsystem 30, a processing subsystem 32, and a network interface 34. The radio subsystem 30 generally includes analog and, in some embodiments, digital components for wirelessly sending and receiving data to and from neighboring access nodes 12. In particular embodiments, the radio subsystem 30 includes the transmitter 16-0 and the receiver 18-0, which are capable of transmitting suitable information wirelessly to and receiving suitable information from other network nodes. From a wireless communications protocol view, the radio subsystem 30 implements at least part of Layer 1 (i.e., the Physical or "PHY" Layer).

The processing subsystem 32 generally implements any remaining portion of Layer 1 not implemented in the radio subsystem 30 as well as functions for higher layers in the wireless communications protocol (e.g., Layer 2 (data link layer), Layer 3 (network layer), etc.). In particular embodiments, the processing subsystem 32 may comprise, for example, one or several general-purpose or special-purpose microprocessors or other microcontrollers programmed with suitable software and/or firmware to carry out some or all of the functionality of the aggregation node 14 described herein. In addition or alternatively, the processing subsystem 32 may comprise various digital hardware blocks (e.g., one or more Application Specific Integrated Circuits (ASICs), one or more off-the-shelf digital and analog hardware components, or a combination thereof) configured to carry out some or all of the functionality of the aggregation node 14 described herein. Additionally, in particular embodiments, the above described functionality of the aggregation node 14 may be implemented, in whole or in part, by the processing subsystem 32 executing software or other instructions stored on a non-transitory computer-readable medium, such as Random Access Memory (RAM), Read Only Memory (ROM), a magnetic storage device, an optical storage device, or any other suitable type of data storage components. In particular, the processing subsystem 32 may include the LMCM 20-0 and the RUM 22-0 of FIG. 8, the LMCM 20-0 and the centralized RUM 24 of FIG. 10, or the centralized LMCM 26 and the centralized RUM 24 of FIG. 12, where these various modules may be implemented in hardware or a combination of hardware and software. Lastly, the aggregation node 14 includes the network interface 34 that provides a connection, which is preferably wired, to a network. This network may be the core network of an associated cellular communications network or a public or private network through which the aggregation node 14 is capable of connecting to the associated cellular communications network.

FIG. 14 is a block diagram of one of the access nodes 12 according to one embodiment of the present disclosure. As illustrated, the access node 12 includes a radio subsystem 36 and a processing subsystem 38. The radio subsystem 36 generally includes analog and, in some embodiments, digital components for wirelessly sending and receiving data to and from wireless devices served by the access node 12 as well as neighboring access nodes 12 (e.g., for wireless self-backhaul). In particular embodiments, the radio subsystem 36 includes the transmitter 16 and the receiver 18 of the access node 12, which are capable of transmitting suitable information wirelessly to and receiving suitable information from other network nodes. From a wireless communications protocol view, the radio subsystem 36 implements at least part of Layer 1 (i.e., the Physical or "PHY" Layer).

The processing subsystem 38 generally implements any remaining portion of Layer 1 not implemented in the radio subsystem 36 as well as functions for higher layers in the wireless communications protocol (e.g., Layer 2 (data link layer), Layer 3 (network layer), etc.). In particular embodiments, the processing subsystem 38 may comprise, for example, one or several general-purpose or special-purpose microprocessors or other microcontrollers programmed with suitable software and/or firmware to carry out some or all of the functionality of the access node 12 described herein. In addition or alternatively, the processing subsystem 38 may comprise various digital hardware blocks (e.g., one or more ASICs, one or more off-the-shelf digital and analog hardware components, or a combination thereof) configured to carry out some or all of the functionality of the access node 12 described herein. Additionally, in particular embodiments, the above described functionality of the access node 12 may be implemented, in whole or in part, by the processing subsystem 38 executing software or other instructions stored on a non-transitory computer-readable medium, such as RAM, ROM, a magnetic storage device, an optical storage device, or any other suitable type of data storage components. In particular, the processing subsystem 38 may include the LMCM 20 and the RUM 22 of FIG. 8, the LMCM 20 of FIG. 10, or the SINR CM 28 of FIG. 12, where these various modules may be implemented in hardware or a combination of hardware and software.

The following acronyms are used throughout this disclosure.

AN Access Node
ASIC Application Specific Integrated Circuit
ETT Expected Transmission Time LMCM Link Metric Computation Module
LTE Long Term Evolution
MIC Metric of Interference and Channel-Switching
MMW Millimeter Wave
MTM Medium Time Metric
OFDM Orthogonal Frequency Division Multiplex
QAM Quadrature Amplitude Modulation
RAM Random Access Memory
ROM Read Only Memory
RUM Routing Update Module
RX Receive
SINR Signal-to-Interference-plus-Noise Ratio
TX Transmission
WCETT Weighted Cumulative Expected Transmission Time Those skilled in the art will recognize improvements and modifications to the preferred embodiments of the present disclosure. All such improvements and modifications are considered within the scope of the concepts disclosed herein and the claims that follow.

What is claimed is:

1. A method comprising:
computing one or more mutual information values for a link between a transmitter of a first network node and a receiver of a second network node in a wireless mesh network, wherein each of the one or more mutual information values comprises a mutual information value for the link for a different one of one or more transmission modes, wherein the one or more transmission modes comprise a plurality of hypothesized transmission modes, and each hypothesized transmission mode corresponds to a different combination of transmission configuration parameters for the transmitter of the first network node and transmitters of one or more neighboring network nodes in the wireless mesh network that potentially cause interference to the link between the transmitter of the first network node and the receiver of the second network node;
computing one or more link metrics for the link as a function of the one or more mutual information values, where each link metric of the one or more link metrics is a function of a different one of the one or more mutual information values; and
providing at least one of the one or more link metrics to a routing update module.

2. The method of claim 1 wherein computing the one or more mutual information values comprises, for each transmission mode of the one or more transmission modes:
computing a signal-to-interference-plus-noise ratio for the link for the transmission mode; and
computing the mutual information value for the link for the transmission mode as a function of the signal-to-interference-plus-noise ratio.

3. The method of claim 1 wherein computing the one or more mutual information values comprises, for each hypothesized transmission mode of the plurality of hypothesized transmission modes:
computing a signal-to-interference-plus-noise ratio for the link for the hypothesized transmission mode; and
computing the mutual information value for the link for the hypothesized transmission mode as a function of the signal-to-interference-plus-noise ratio.

4. The method of claim 3 wherein, for each hypothesized transmission mode of the plurality of hypothesized transmission modes, computing the mutual information value for the link for the hypothesized transmission mode as a function of the signal-to-interference-plus-noise ratio comprises computing the mutual information value as a logarithm of a function of the signal-to-interference-plus-noise ratio for the link for the hypothesized transmission mode.

5. The method of claim 3 wherein, for each hypothesized transmission mode of the plurality of hypothesized transmission modes, computing the mutual information value for the link for the hypothesized transmission mode as a function of the signal-to-interference-plus-noise ratio comprises computing the mutual information value as:

$$I(l,m) = \log_2(1 + SINR(l,m)) \equiv D_1(SINR(l,m))$$

where $I(l,m)$ is the mutual information value for the link $l$ for the hypothesized transmission mode $m$ and $SINR(l,m)$ is the signal-to-interference-plus-noise ratio for the link $l$ for the hypothesized transmission mode $m$.

6. The method of claim 5 wherein the transmitter of the first network node has a single antenna.

7. The method of claim 6 wherein, for each hypothesized transmission mode of the plurality of hypothesized transmission modes, computing the signal-to-interference-plus-noise ratio for the link for the hypothesized transmission mode comprises computing the signal-to-interference-plus-noise ratio for the link for the hypothesized transmission mode based on the equation:

$$SINR(l,m) \equiv \frac{p_{l,m} g_l}{q_{l,m}},$$

where $$q_{l,m} \equiv \sigma_l^2 + \sum_{l' \in N_l} p_{l',m} g_{l'}$$

denotes a power level of noise-plus-interference, and where $p_{l,m}$ is a transmit power of the transmitter of the first network node for the link $l$ for the hypothesized transmission mode $m$, $g_l$ is a channel gain of the link $l$ for the hypothesized transmission mode $m$, $q_{l,m}$ is a noise-plus-interference power for the link $l$ for the hypothesized transmission mode $m$, $\sigma_l^2$ is a noise power at the receiver of the second network node for the link $l$, and $N_l$ is a set of all links of the one or more neighboring network nodes that interfere with the link $l$.

8. The method of claim 5 wherein the transmitter of the first network node has multiple antennas and transmits a single stream.

9. The method of claim 8 wherein, for each hypothesized transmission mode of the plurality of hypothesized transmission modes, computing the signal-to-interference-plus-noise ratio for the link for the hypothesized transmission mode comprises computing the signal-to-interference-plus-noise ratio for the link for the hypothesized transmission mode based on the equation:

$$SINR(l,m) = p_{l,m}{}^H H_{l,m}{}^H Q_{l,m}{}^{-1} H_l p_{l,m}$$

where $p_{l,m}$ is a precoding vector defined as:

$$p_{l,m} = (p_{l,m}{}^{(1)}, p_{l,m}{}^{(2)}, \ldots, p_{l,m}{}^{(n_{T,l})})^T$$

whose elements specify an antenna weight assigned to the multiple $n_{T,l}$ antennas of the transmitter of the first network node for the link $l$ for the hypothesized transmission mode $m$, $H_l$ is a $n_{R,l}$-by-$n_{T,l}$ channel response matrix whose elements specify a complex-valued channel gain from each of the multiple antennas of the transmitter of the first network node to each of a number $n_{R,l}$ of receive antennas of the receiver of the second network node for the link $l$, $$Q_{l,m} = Q_{noise} + \Sigma H_l p_{l',m} p_{l',m}{}^H H_l{}^H$$

is a noise-plus-interference covariance matrix, and $Q_{noise}$ is a covariance matrix of noise.

10. The method of claim 1 wherein the transmitter of the first network node has multiple antennas and transmits multiple streams.

11. The method of claim 10 wherein computing the one or more mutual information values comprises, for each hypothesized transmission mode of the plurality of hypothesized transmission modes:
   computing a per-stream signal-to-interference-plus-noise ratio for the link for the hypothesized transmission mode for each stream of the multiple streams; and
   computing the mutual information value for the link for the hypothesized transmission mode as a function of the per-stream signal-to-interference-plus-noise ratios for the multiple streams.

12. The method of claim 11 wherein, for each hypothesized transmission mode of the plurality of hypothesized transmission modes, computing the mutual information value for the link for the hypothesized transmission mode as a function of the per-stream signal-to-interference-plus-noise ratios for the multiple streams comprises computing the mutual information value as:

$$I(l, m) = \text{logdet}(I + P_{l,m}^H H_l^H Q_{l,m}^{-1} H_l P_{l,m})$$
$$= \sum_{i=1}^{n_S(l,m)} D_1(\text{SINR}^{(i)}(l, m))$$

where $$D_1(\text{SINR}^{(i)}(l,m)) \equiv \log_2(1 + \text{SINR}^{(i)}(l,m))$$

denotes the mutual information value for an i-th data stream communicated over the link for the hypothesized transmission mode, and further where I is an identity matrix of size $n_{R,l}$-by-$n_{R,l}$, $\log(\cdot)$ is a logarithm function, $\det(X)$ denotes a determinant of the matrix X, $P_{l,m}$ is a precoding matrix for the link l for the hypothesized transmission mode, m, defined as:

$$P_{l,m} = (p_{l,m,1}, p_{l,m,2}, \ldots, p_{l,m,n_S(l,m)})$$

with each column $p_{l,m,i}$ corresponding to a precoding vector of size $n_{T,l}$ for one of the multiple $n_s(l,m)$ streams transmitted from the transmitter of the first network node to the receiver of the second network node over the link l, $H_l$ is a $n_{R,l}$-by-$n_{T,l}$ channel response matrix whose elements specify a complex-valued channel gain from each of a number $n_{T,l}$ of antennas of the transmitter of the first network node to each of a number $n_{R,l}$ of receive antennas of the receiver of the second network node for the link l, $Q_{l,m}$ is a noise-plus-interference covariance matrix for the link l for the hypothesized transmission mode m, and $\text{SINR}^{(i)}(l,m)$ is the per-stream signal-to-interference-plus-noise ratio for an i-th stream of the multiple streams for the link l for the hypothesized transmission mode m.

13. The method of claim 12 wherein, for each of the multiple streams, the receiver of the second network node is enabled to successively cancel interference caused by other streams, and the per-stream signal-to-interference-plus-noise ratio for the i-th stream of the multiple streams for the link l for the hypothesized transmission mode m is defined as:

$$\text{SINR}^{(i)}(l,m) \equiv p_{l,m,i}^H H_l^H Q_{l,m,i}^{-1} H_l p_{l,m,i}$$

where $$Q_{l,m,i} \equiv Q_{l,m} + \sum_{j>i} H_l p_{l,m,j} p_{l,m,j}^H H_l^H$$
$$= Q_{noise} + \sum_{l' \in N_l} H_{l'} p_{l',m} p_{l',m}^H H_{l'}^H + \sum_{j>i} H_l p_{l,m,j} p_{l,m,j}^H H_l^H$$

is a per-stream noise-plus-interference covariance matrix for the i-th stream of the multiple streams for the link l for the hypothesized transmission mode m.

14. The method of claim 12 wherein the receiver of the second network node is not enabled to perform successive interference cancellation for the multiple streams, and the per-stream signal-to-interference-plus-noise ratio for the i-th stream of the multiple streams for the link l for the hypothesized transmission mode m is defined as:

$$\text{SINR}^{(i)}(l,m) \equiv p_{l,m,i}^H H_l^H Q_{l,m,i}^{-1} H_l p_{l,m,i}$$

where $$Q_{l,m,i} \equiv Q_{l,m} + \sum_{j \neq i} H_l p_{l,m,j} p_{l,m,j}^H H_l^H$$
$$= Q_{noise} + \sum_{l' \in N_l} H_{l'} p_{l',m} p_{l',m}^H H_{l'}^H + \sum_{j \neq i} H_l p_{l,m,j} p_{l,m,j}^H H_l^H$$

is a per-stream noise-plus-interference covariance matrix for the i-th stream of the multiple streams for the link l for the hypothesized transmission mode m.

15. The method of claim 1 wherein the link is provided according to a multi-subcarrier wireless communication scheme, and computing the one or more mutual information values comprises, for each transmission mode of the one or more transmission modes, computing the mutual information value for the link for the transmission mode as a function of instantaneous mutual information values of individual subcarriers for the link for the transmission mode over multiple subcarriers.

16. The method of claim 1 wherein computing the one or more mutual information values comprises, for each transmission mode of the one or more transmission modes, computing the mutual information value for the link for the transmission mode as a function of instantaneous mutual information values of individual time slots for the link for the transmission mode over multiple time slots.

17. The method of claim 1 wherein computing the one or more mutual information values comprises computing the one or more mutual information values at the second network node.

18. The method of claim 17 wherein providing the at least one of the one or more link metrics to the routing update module comprises providing the at least one of the one or more link metrics to the routing update module at the first network node.

19. The method of claim 17 wherein the routing update module is a centralized routing update module at a centralized node associated with the wireless mesh network, and providing the at least one of the one or more link metrics to the routing update module comprises providing the at least one of the one or more link metrics to the routing update module at the centralized node.

20. The method of claim 1 wherein computing the one or more mutual information values comprises computing the one or more mutual information values at a centralized link metric computing module at a centralized node associated with the wireless mesh network.

21. The method of claim 1 further comprising:
   computing, by the routing update module, one or more routing metrics for one or more potential routes through the wireless mesh network comprising the link between the transmitter of the first network node and the receiver of the second network node based on the at least one of the one or more link metrics for the link between the transmitter of the first network node and the receiver of the second network node; and updating a routing table for the transmitter of the first network node based on the one or more routing metrics.

22. The method of claim 21 wherein the routing update module is at the first network node.

23. The method of claim 21 wherein the routing update module is a centralized routing update module at a centralized node associated with the wireless mesh network, and the method further comprises providing the routing table from the centralized node to the first network node.

24. The method of claim 1 wherein the wireless mesh network is a wireless mesh backhaul network for a plurality of wireless access nodes, including the first network node and the second network node, for a cellular communications network.

25. A method comprising:
for each link of a plurality of links between transmitters and receivers of at least a subset of a plurality of network nodes in a wireless mesh network, obtaining two or more mutual information based link metrics for the link, wherein each of the two or more mutual information based link metrics comprises a mutual information based link metric for the link for a different one of the two or more transmission modes for the link;
computing a plurality of routing metrics for a plurality of potential routes through the wireless mesh network from a first network node to a second network node as a function of the two or more mutual information based link metrics for ones of the plurality of links included in the plurality of potential routes;
selecting one of the plurality of potential routes having a best routing metric from the plurality of routing metrics as a best route from the first network node to the second network node, the best route also being indicative of a best transmission mode for each link from the plurality of links that is included in the best route; and
updating a routing table to reflect the best route from the first network node to the second network node.

* * * * *